(12) United States Patent
Chantry et al.

(10) Patent No.: US 10,825,036 B2
(45) Date of Patent: Nov. 3, 2020

(54) SYSTEMS AND METHODS TO ACCOMMODATE MULTI-PARTY BUSINESS RELATIONSHIPS

(71) Applicant: Lincoln Global, Inc., City of Industry, CA (US)

(72) Inventors: Bruce John Chantry, Solon, OH (US); George D. Blankenship, Chardon, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 528 days.

(21) Appl. No.: 14/161,728

(22) Filed: Jan. 23, 2014

(65) Prior Publication Data

US 2015/0127437 A1 May 7, 2015

Related U.S. Application Data

(60) Provisional application No. 61/900,614, filed on Nov. 6, 2013.

(51) Int. Cl.
*G06Q 30/00* (2012.01)
*G06Q 30/02* (2012.01)
*G05B 19/418* (2006.01)

(52) U.S. Cl.
CPC ......... *G06Q 30/0214* (2013.01); *G06Q 30/01* (2013.01)

(58) Field of Classification Search
CPC ........... G06Q 30/0229; G06Q 30/0214; G06Q 30/0207; G06Q 30/0215; G06Q 30/0234; G06Q 30/0236; G06Q 30/01
See application file for complete search history.

(56) References Cited

U.S. PATENT DOCUMENTS

| | | | |
|---|---|---|---|
| 5,233,514 A | 8/1993 | Ayyoubi et al. | |
| 6,594,641 B1 * | 7/2003 | Southam | G06Q 30/06 705/26.41 |
| 7,359,874 B2 * | 4/2008 | Seaman | G06Q 10/06 705/28 |
| 7,644,862 B2 * | 1/2010 | Rolf | G06Q 30/02 235/383 |
| 2001/0032134 A1 | 10/2001 | Hardesty | |

(Continued)

OTHER PUBLICATIONS

WO2002057889A2 (EDWARDS). "Electronic procurement". (Year: 2001).*

(Continued)

*Primary Examiner* — Maria V Vanderhorst
(74) *Attorney, Agent, or Firm* — Tucker Ellis LLP

(57) ABSTRACT

Systems and methods to accommodate business relationships between a supplier, an original equipment manufacturer (OEM), and an end user. A supplier provides a server having a web site that is accessible by OEM's and end users to purchase subsystems and consumable parts and materials. The OEM's and end users are associated with each other by the server in accordance with established business relationships. The server manages accounts of the OEM's and associated end users to reward on-line credits to the OEM's and the end users when the OEM's and the end users make purchases from the supplier. The rewarding of on-line credits are structured to generate additional business for the supplier from the OEM's and the associated end users.

20 Claims, 23 Drawing Sheets

(56) References Cited

U.S. PATENT DOCUMENTS

| | | | | |
|---|---|---|---|---|
| 2002/0082920 A1* | 6/2002 | Austin | G06Q 30/02 705/14.25 |
| 2004/0186797 A1* | 9/2004 | Schwind | G06Q 30/02 705/29 |
| 2005/0131769 A1* | 6/2005 | Flynn | G06Q 30/0271 705/14.67 |
| 2007/0219872 A1* | 9/2007 | Rolf | G06Q 30/02 235/383 |
| 2008/0313074 A1* | 12/2008 | Placek | G06Q 20/10 705/39 |
| 2009/0276305 A1* | 11/2009 | Clopp | G06Q 30/0214 705/14.16 |
| 2012/0271705 A1* | 10/2012 | Postrel | G06Q 30/02 705/14.33 |
| 2013/0284029 A1* | 10/2013 | Reed | G06Q 10/067 99/280 |
| 2015/0127438 A1* | 5/2015 | Wedderburn | G06Q 30/02 705/14.16 |

OTHER PUBLICATIONS

"Enabling value co-production in the provision of support service engineering solutions using digital manufacturing methods". 2009. IEEE. (Year: 2009).*

International Search Report and the Written Opinion of the International Searching Authority; PCT/IB2014/002246; dated Feb. 2, 2015.

* cited by examiner

Generic Comparison of the Old Discount Versus the New Business-to-Business (B2B) Methodology Generic Comparison of the Old Discount Versus the New Business-to-Business (B2B) Methodology Generic Comparison of the Old Discount Versus the New Business-to-Business (B2B) Methodology Generic Comparison of the Old Discount Versus the New Business-to-Business (B2B) Methodology

Fig. 14

Fig. 16
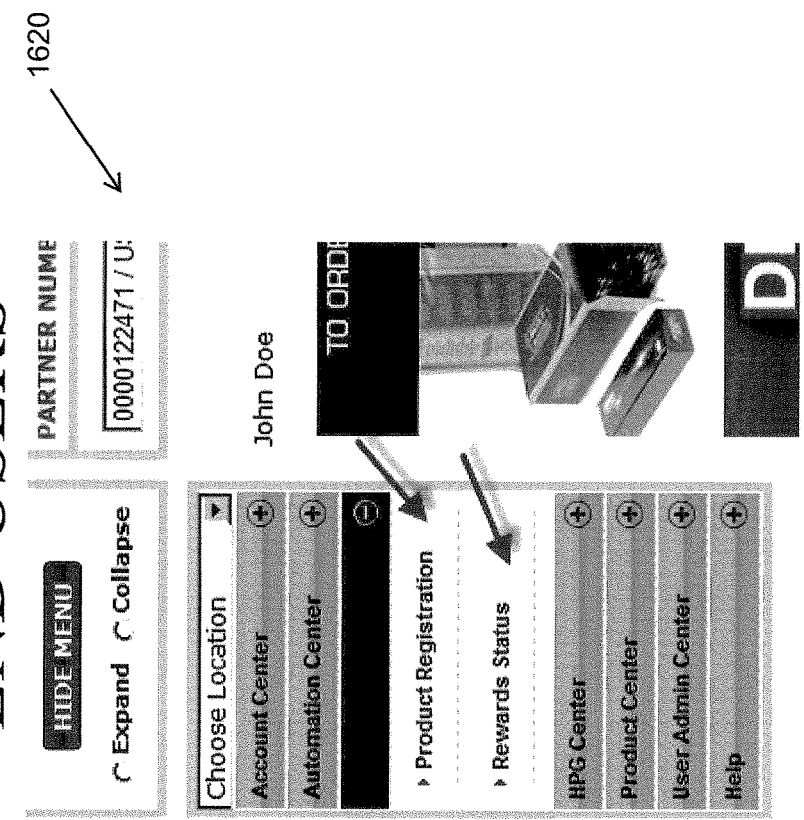
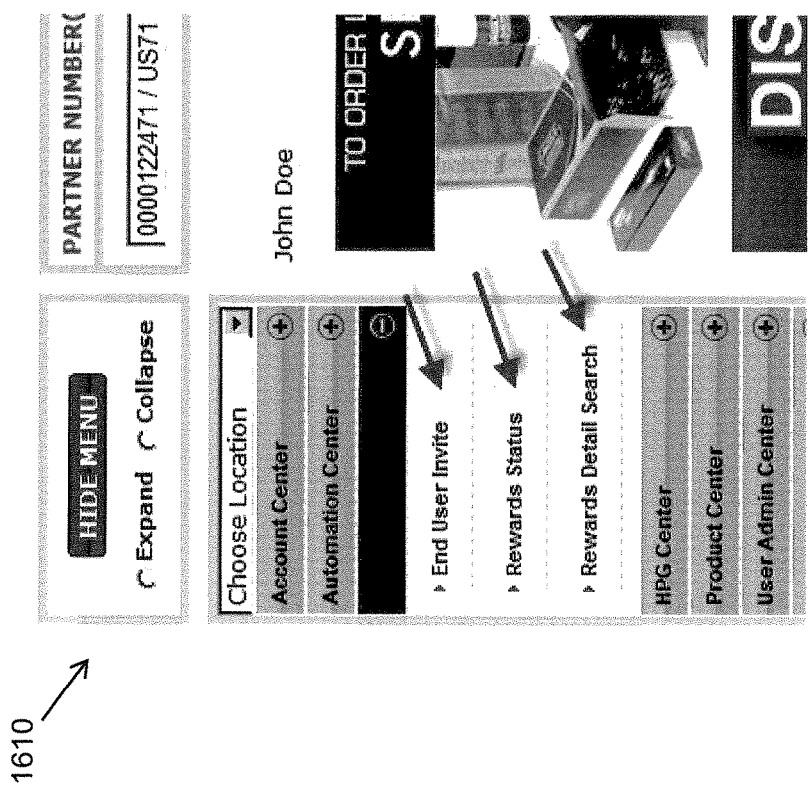

Fig. 22

PARTNER NUMBER (PAYER)

0000000357 [GO]

2200

HIDE MENU
○ Expand ○ Collapse

Choose Location
Account Center
Automation Center
▸ End User Invite
▸ Rewards Status
▸ Rewards Detail Search
HPG Center
Product Center

REWARD DETAIL RESULTS

10/14/2013 9:19:42 AM US Eastern Time Zone

Partner Number(Payer): 0000000357 -
Company Code(Payer): Inc. - US71

| Partner Number(SoldTo) | Name | Invoice Date | Invoice Number | Invoice Amount | Points |
|---|---|---|---|---|---|
| 0000130873 | | 2013-10-10 | 0903245853 | | |
| 0000131035 | | 2013-10-01 | 0903223296 | | |
| 0000131035 | | 2013-10-10 | 0903245603 | | |
| 0000131047 | | 2013-10-11 | 0903249409 | | |
| 0000131047 | | 2013-09-25 | 0903207759 | | |
| 0000131217 | | 2013-10-04 | 0903232699 | | |
| 0000131217 | | 2013-10-03 | 0903229812 | | |
| | | 2013-10-08 | 0903239161 | | |

Fig. 23

Home > Extranet

EQUIPMENT  CONSUMABLES  SYSTEM SOLUTIONS  INDUSTRIES  EDUCATION  SUPPORT  COMPANY  SPORTS

Welcome, Bernie  Logout  My Account  My Shopping List  Order Status
Ask the Experts  Distributor Locator  Contact Us
My Cart  4 Items  $53,913.50 USD
Search  GO SHOW MENU
○ Expand  ○ Collapse

PARTNER NUMBER (PAYER)
0000000357  GO

Select Products  View Cart  Shipping Information  Billing Information  Order Summary  Order Confirmation

ACCOUNT CENTER

ONLINE ORDERING INC.

10/14/2013 9:03:34 AM US Eastern Time Zone

Partner Number (SoldTo): 0000052497 -
Sales Organization (SoldTo): Inc. - US71
Distribution Channel (SoldTo): Domestic - 10

| Quantity | Part Number / Customer Part Number | Description | Availability | | Unit | | | Ext. Net Price |
|---|---|---|---|---|---|---|---|---|
| | | | Qty | From | Industrial Price | Net Price | UOM | |
| 2 EA | BK277110 | IRC 30/50A (SS-A) | 2 | 2710 - | | | 1 EA | USD |
| 2 EA | BK277145 | SC 30A (MS, AL) | 2 | 2710 - | | | 1 EA | USD |
| 5 EA | BK277286 | SC 100A (MS, SS-A, AL) | 5 | 2710 - | | | 1 EA | USD |
| 1 EA | BK300038-13851 | ONE-PAK, SPIRIT II 275, PHANTOM 2 AXIS AC | 0 | 2710 - Backordered | | | 1 EA | USD |

1:1 Points
% Kicker $ Rewards

Items Total: USD
Base Points Used: USD
Bonus Points Used: USD
Taxes: $0.00 USD
Shipping: $0.00 USD
Order Total: USD

REMOVE POINTS

You can choose NOT to use Reward Points on this order if you like?

2300 →

SYSTEMS AND METHODS TO ACCOMMODATE MULTI-PARTY BUSINESS RELATIONSHIPS

This U.S. patent application claims the benefit of and priority to U.S. provisional patent application Ser. No. 61/900,614 filed on Nov. 6, 2013 which is incorporated herein by reference in its entirety.

TECHNICAL FIELD

Certain embodiments of the present invention relate to business relationships. More particularly, certain embodiments of the present invention relate to systems and methods to accommodate business relationships between a supplier, an original equipment manufacturer (OEM), and an end user.

BACKGROUND

An OEM may purchase a subsystem from a supplier, integrate the subsystem into a larger system, and sell the larger system to an end user. When the end user needs replacement parts or consumable materials for the subsystem portion of the larger system, the end user may logically go back to the OEM and make the request. However, it may be inefficient for the end user to go through the OEM for replacement parts and materials for the subsystem, since the subsystem originally came from the supplier. The OEM would have to process the request of the end user and then go back to the supplier to get the parts/materials, acting as a middle man between the end user and the supplier, thus driving up costs to the end user. Alternately, if the end user goes directly to the supplier for replacement parts/materials (assuming the end user knows the identity of the supplier), the OEM doesn't get any credit or benefit for having originally established that relationship or connection between the supplier and the end user through the original sale of the larger system to the end user. Therefore, there is a need for a more effective and equitable relationship between a supplier, an OEM, and an end user, that provides mutually beneficial incentives to each.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

A system, a method, and computer-readable media are provided to accommodate business relationships between a supplier, an original equipment manufacturer (OEM), and an end user. A supplier provides a server having a web site that is accessible by OEM's and end users to purchase subsystems and consumable parts and materials. The OEM's and end users are associated with each other in the server in accordance with established business relationships. The server manages accounts of the OEM's and associated end users to reward on-line credits to the OEM's and the end users when the OEM's and the end users make purchases from the supplier. The rewarding of on-line credits are structured to generate business for the supplier from the OEM's and the associated end users.

In one embodiment, a system is provided having a supplier server computer having a supplier web site providing on-line ordering and account management functionality for original equipment manufacturers (OEMs) and end users associated with a supplier, and an account database computer operatively connected to the supplier server computer and storing a database of OEM accounts and end user accounts. The on-line ordering and account management functionality is configured to: credit an OEM account of an OEM with first OEM on-line account credits in response to the OEM purchasing a first supplier subsystem via the supplier web site of the supplier server computer; credit the OEM account of the OEM with second OEM on-line account credits in response to an end user of the first supplier subsystem purchasing replacement parts or materials via the supplier web site of the supplier server computer; and generate enhanced OEM on-line account credits based on at least one of the first and second OEM on-line account credits, and redeem the enhanced OEM on-line account credits in response to the OEM purchasing a second supplier subsystem via the supplier web site of the supplier server computer.

In one embodiment, a method is provided including the steps of: selling a first supplier subsystem to an OEM via a supplier web site on a supplier server computer; crediting an on-line account of the OEM, in an account database computer operatively connected to the supplier server computer, with first OEM on-line account credits in response to selling the first supplier subsystem to the OEM via the supplier web site on the supplier server computer; selling parts or materials to an end user of the first supplier subsystem via the supplier web site on the supplier server computer; crediting the on-line account of the OEM, in the account database computer, with second OEM on-line account credits in response to selling the parts or materials to the end user via the supplier web site on the supplier server computer; and selling a second supplier subsystem to the OEM via the supplier web site and applying enhanced OEM on-line account credits to the sale of the second supplier subsystem, wherein the enhanced OEM on-line account credits are derived from one or more of the first OEM on-line account credits and the second OEM on-line account credits.

In one embodiment, a system is provided by a supplier of supplier subsystems. The system includes a supplier server, a supplier web site, and a supplier database. The system is configured to provide on-line ordering and account management functionality for original equipment manufacturers and end users of the supplier subsystems to establish business incentives that are mutually beneficial to the supplier, the original equipment manufacturers, and the end users.

In one embodiment, a non-transitory computer readable storage medium including computer-readable instructions tangibly stored thereon for execution by a processor, is provided. The computer-readable instructions include: instructions for crediting an on-line account of an OEM with first OEM on-line account credits in response to selling a first supplier subsystem to the OEM via a supplier web site; instructions for crediting the on-line account of the OEM with second OEM on-line account credits in response to selling parts or materials to an end user of the first supplier subsystem via the supplier web site; instructions for generating enhanced OEM on-line account credits from one or more of the first OEM on-line account credits and the second OEM on-line account credits; and instructions for applying the enhanced OEM on-line account credits to the sale of a second supplier subsystem to the OEM via the supplier web site.

Details of illustrated embodiments of the present invention will be more fully understood from the following description and drawings.

BRIEF DESCRIPTION OF THE DRAWINGS

FIGS. 14-23 illustrate example embodiments of display screens provided by the supplier web site via the supplier server when embodiments of the methods described herein are used.

DETAILED DESCRIPTION

Figure 1:
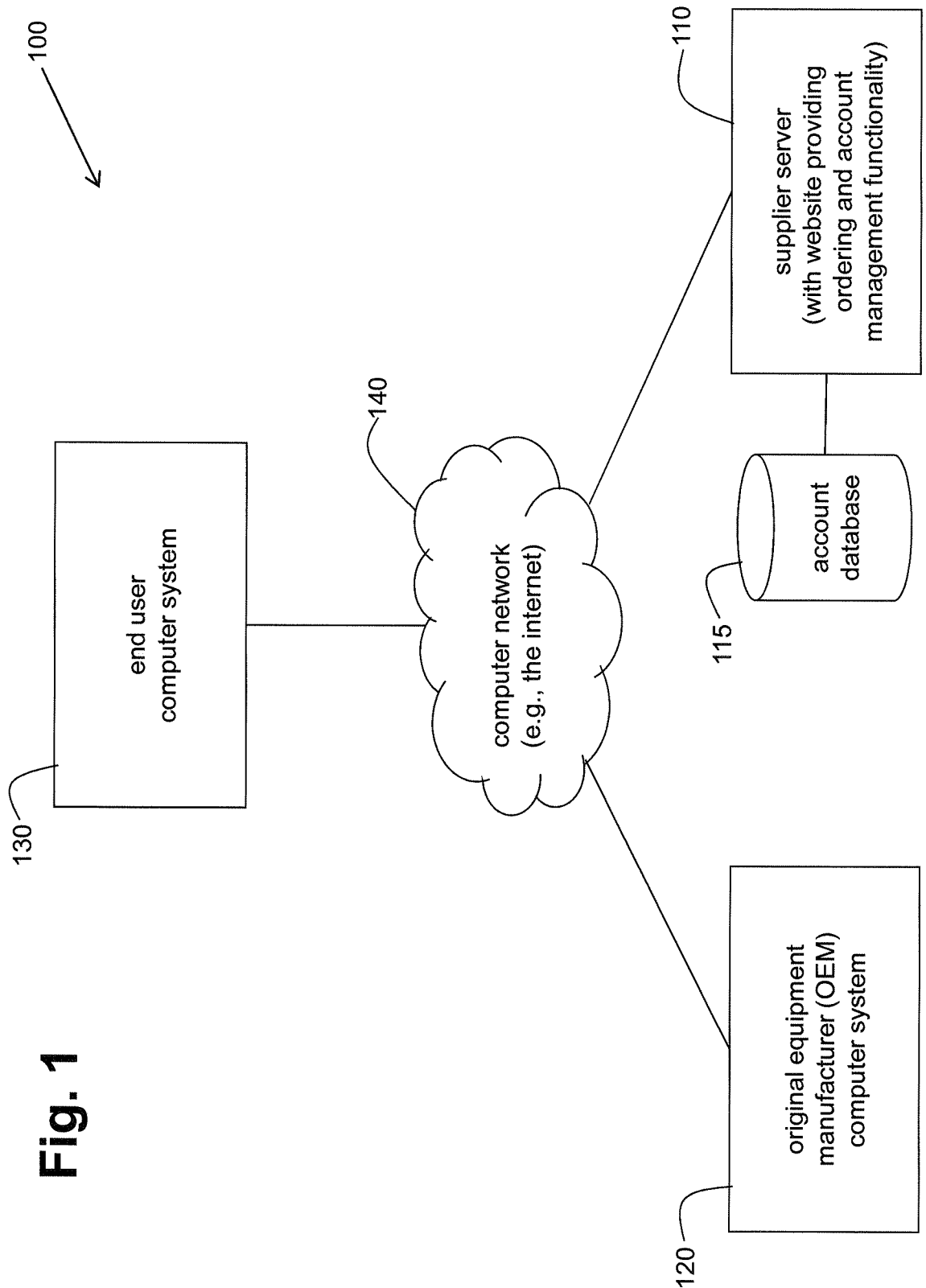
FIG. 1 illustrates a schematic block diagram of an exemplary embodiment of a system (having a supplier server providing a supplier web site) to accommodate business relationships between a supplier, an original equipment manufacturer (OEM), and an end user.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" or "processor" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Computer memory", as used herein, refers to a storage device configured to store digital data or information which can be retrieved by a computer or processing element.

The terms "signal", "data", and "information" may be used interchangeably herein and may be in digital or analog form.

The term "server" is used broadly herein and may refer to the computer and/or programs and software that respond to requests across a computer network to provide, or help to provide, a network service. The terms "server" and "server computer" may be used interchangeably herein.

The term "database" is used broadly herein and may refer to an organized collection of data and/or the computer, programs, and software that organize the data to model relevant aspects of reality in a way that supports processes requiring information. The terms "database" and "database computer" may be used interchangeably herein.

The terms "display screen" and "screen shot" may be used interchangeably herein and refer to displayed or displayable, formatted information that is provided by a server to another computer system to be displayed and interacted therewith (e.g., via displayed icons and data fields).

The term "web site", as used herein, may refer to a location connected to a network that maintains one or more pages on, for example, the World Wide Web; and/or a set of related web pages served from a web domain. A web site is typically hosted on at least one server (e.g., a web server) that is accessible via a network such as the Internet or a private local area network through an Internet address known as a uniform resource locator.

The term "original equipment manufacturer (OEM)" as used herein refers to an entity that obtains a subsystem from a supplier, integrates the subsystem into a larger system, and provides the larger system to an end user.

The term "end user" as used herein refers to an entity that uses a system provided by an OEM.

The term "on-line" as used herein refers to being connected to a computer network (e.g., making a purchase on-line by performing actions as part of being connected to a computer network).

The term "on-line account" as used herein refers to an account that is primarily accessed and managed over a communication network such as, for example, the Internet.

The terms "credits" and "on-line account credits" as used herein may refer to rewards or points that an OEM or an end user may accrue in an on-line account by using a supplier web site.

The term "functionality" as used herein may refer to the logical actions and supporting display screens of a system implemented in software and/or hardware.

To put an example embodiment in context, the supplier is a supplier of a subsystem (e.g., a plasma cutting subsystem) to the OEM. The OEM integrates the subsystem into a larger system (e.g., a plasma cutting system with a table, cables, and controls) and provides the larger system to an end user (e.g., a company that makes automobile parts using the larger system).

FIG. 1 illustrates a schematic block diagram of an exemplary embodiment of a system 100 to accommodate business relationships between a supplier, an original equipment manufacturer (OEM), and an end user. The system 100 includes a supplier server 110 having a website providing ordering and account management functionality. The system 100 further includes at least one original equipment manufacturer (OEM) computer system 120 and at least one end user computer system 130. The system 100 also includes a computer network 140 (e.g., the internet) configured to provide network communication between the supplier server 110, the OEM computer system 120, and the end user computer system 130. The system 100 also includes an account database 115 operatively connected to the supplier server 110 and storing account information as discussed herein (e.g., OEM on-line account information and end user on-line account information). In accordance with an embodiment, the web site of the supplier server 110 provides display screens or screen shots to the OEM computer system 120 and the end user computer system 130 such that users of the OEM computer system and the end user computer system can view and interact with the web site of the supplier server.

Figure 2:
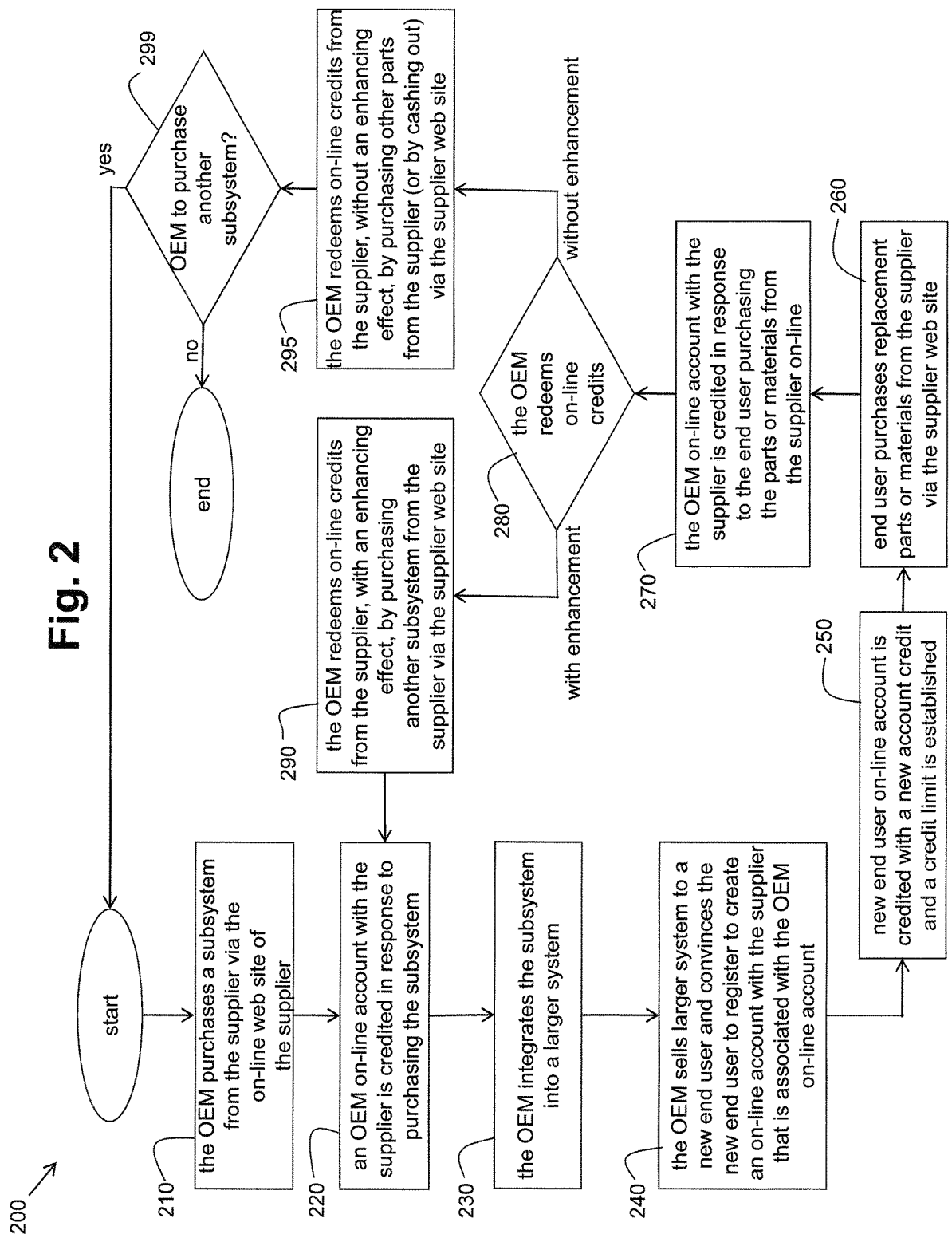
FIG. 2 illustrates a flow chart of an exemplary embodiment of a method to accommodate business relationships between a supplier, an original equipment manufacturer (OEM), and an end user using the system of FIG. 1.

FIG. 2 illustrates a flow chart of an exemplary embodiment of a business-to-business (B2B) method 200 to accommodate business relationships between a supplier, an original equipment manufacturer (OEM), and an end user using the system 100 of FIG. 1. In step 210 of the method 200, the OEM purchases a subsystem from the supplier via an on-line web site of the supplier using the OEM computer system 120. The OEM has an on-line account with the supplier, in accordance with an embodiment. The OEM on-line account is stored in the account database 115 and managed by the supplier server 110, and was originally set up when the OEM registered with the supplier via the supplier web site using the OEM computer system 120. In step 220, the OEM on-line account with the supplier is automatically credited in response to the OEM purchasing the subsystem on-line.

In step 230 of the method 200, the OEM integrates the subsystem from the supplier into a larger system. In step 240, the OEM sells the larger system to a new end user and convinces the new end user to register the subsystem and create an on-line account with the supplier via the supplier web site, using the end user computer system 130, such that the end user on-line account is associated with the OEM. In step 250, the new end user on-line account with the supplier is automatically credited with a new account credit, and a credit limit is automatically established for the end user in response to the end user on-line account being created. The end user on-line account is stored in the account database 115 and managed by the supplier server 110.

The term "x", in the terms "$x" and "x %", is used herein to represent a dollar amount or a percentage amount. No specific numbers for "x" are provided herein, as the specific numbers may be different for different embodiments.

Figure 3:
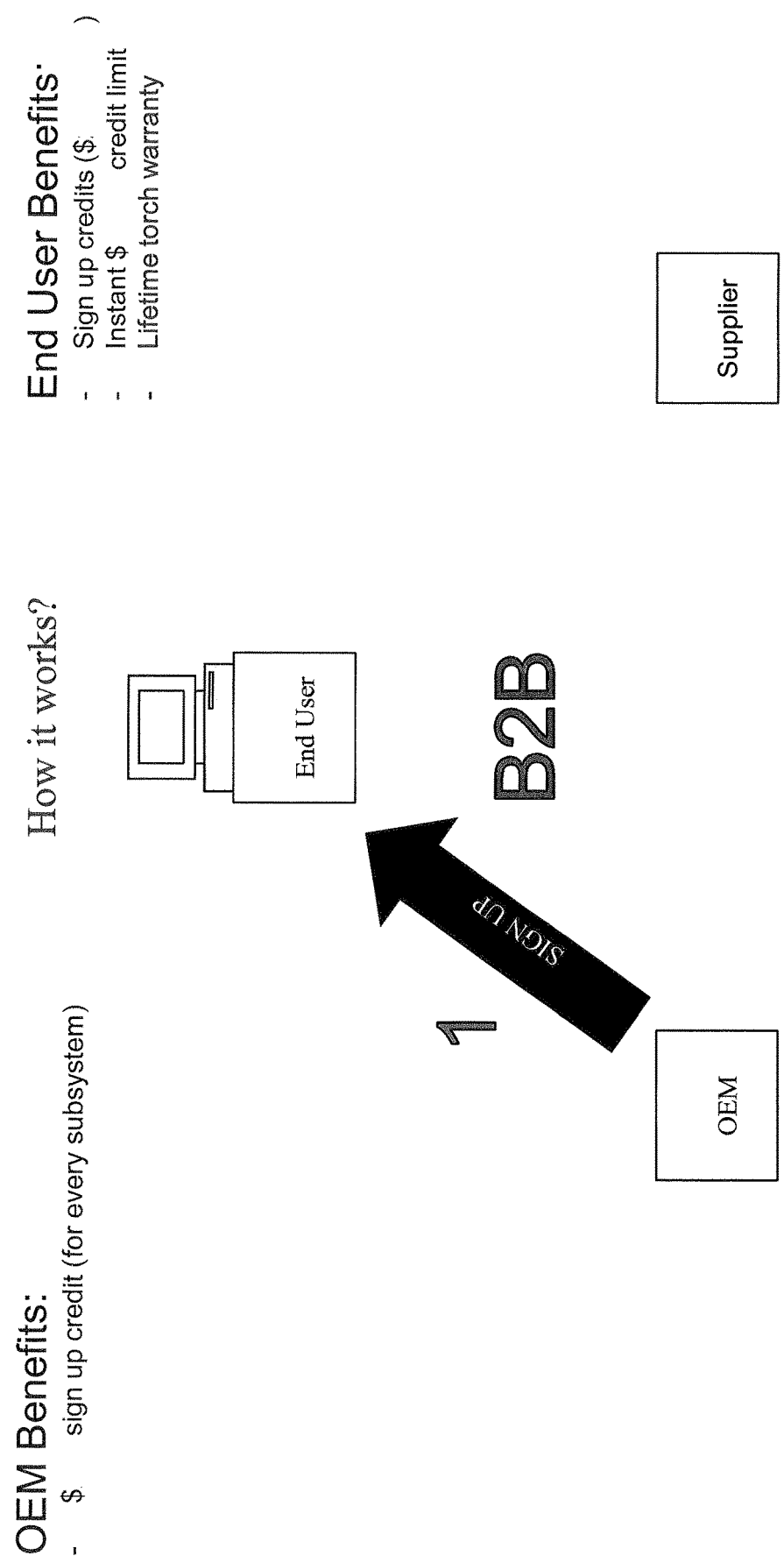
FIGS. 3-8 illustrate diagrams showing how benefits accrue to an OEM and to an end user using embodiments of the methods and systems described herein.

FIG. 3 illustrates a diagram showing how benefits accrue to the OEM and to the end user over steps 210 and 250 of the method 200 of FIG. 2, in accordance with an embodiment. For example, the OEM may receive an on-line credit worth $x for purchasing the subsystem from the supplier. The end user may receive a sign up credit of $x, an instant $x credit limit, and a lifetime warranty on the cutting torch of the purchased subsystem (e.g., a plasma cutting subsystem) from the supplier.

In step 260 of the method 200, the end user purchases replacement parts or materials from the supplier via the supplier web site using the end user computer system 130. In step 270, the OEM on-line account associated with the end user is automatically credited in response to the end user purchasing the parts or materials from the supplier.

Figure 4:
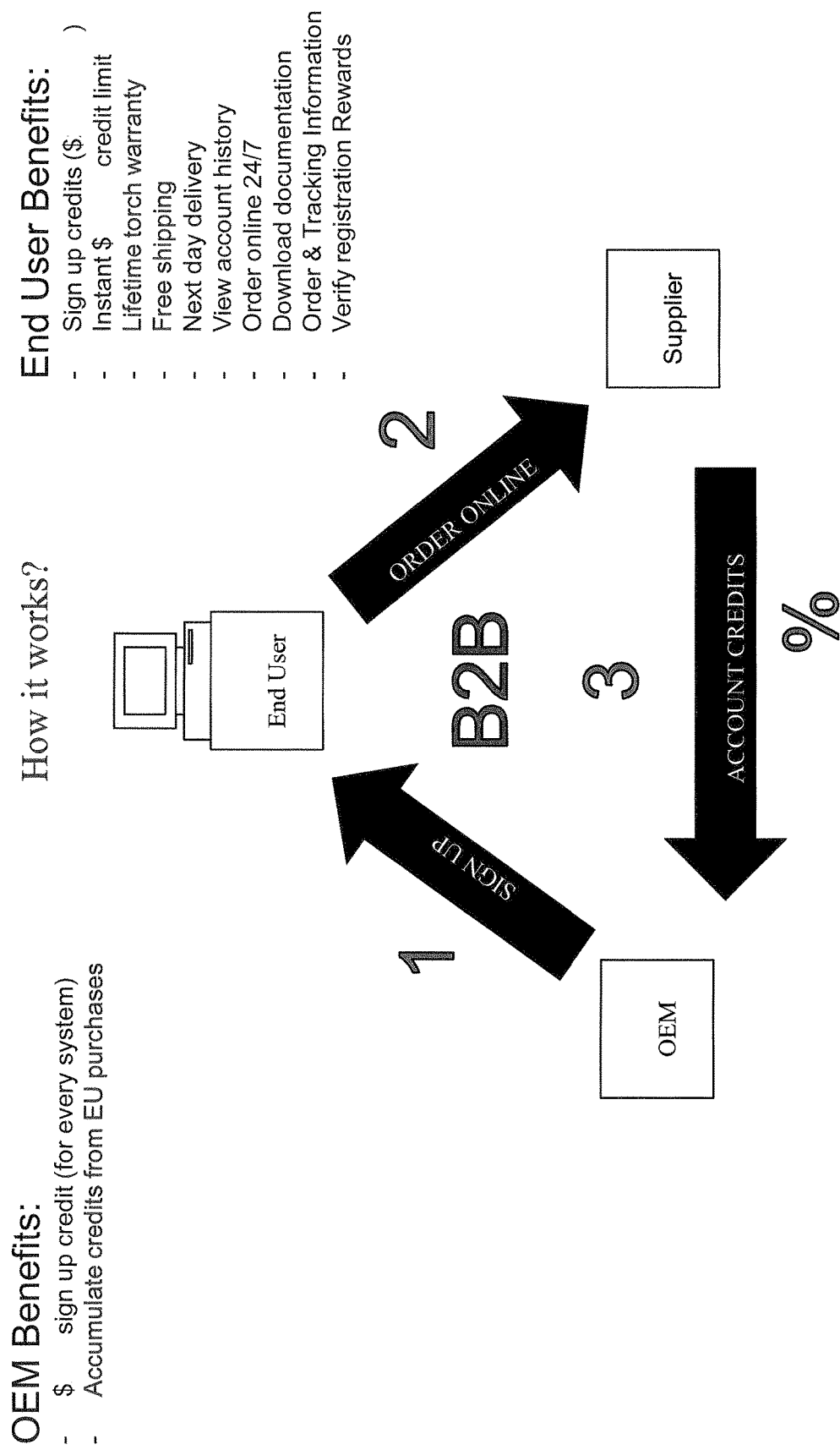

FIG. 4 illustrates a diagram showing the accrual of benefits from FIG. 3 as well as how further benefits accrue to the OEM and to the end user over steps 260 and 270 of the method 200 of FIG. 2, in accordance with an embodiment. For example, the OEM accumulates additional on-line credits in response to the end user purchasing replacement parts or materials from the supplier. Furthermore, the end user receives free shipping of parts and materials from the supplier and next day delivery. The end user is also able to review its account history, place orders for parts and materials on-line at any time (24/7), download documentation, view order and tracking information, and verify registration rewards, all via its on-line account provided by the supplier server and web site 110.

In step 280 of the method 200, the OEM may decide to redeem OEM on-line credits in one of two ways via the OEM account of the OEM supplied by the supplier server 110 using the OEM computer system 120. OEM on-line credits may be redeemed with a multiplier or other enhancement applied to the OEM on-line credits. Alternatively, OEM on-line credits may be redeemed directly, without a multiplier or other enhancement applied to the OEM on-line credits.

If the OEM chooses to redeem on-line credits the first way then, in step 290, the OEM redeems on-line credits in an enhanced manner from the supplier by purchasing another subsystem from the supplier via the supplier web site. That is, the on-line credits of the OEM are multiplied up or enhanced (e.g., by x %) when the OEM purchases another subsystem (e.g., a plasma cutting subsystem) using the OEM on-line credits.

Figure 5:
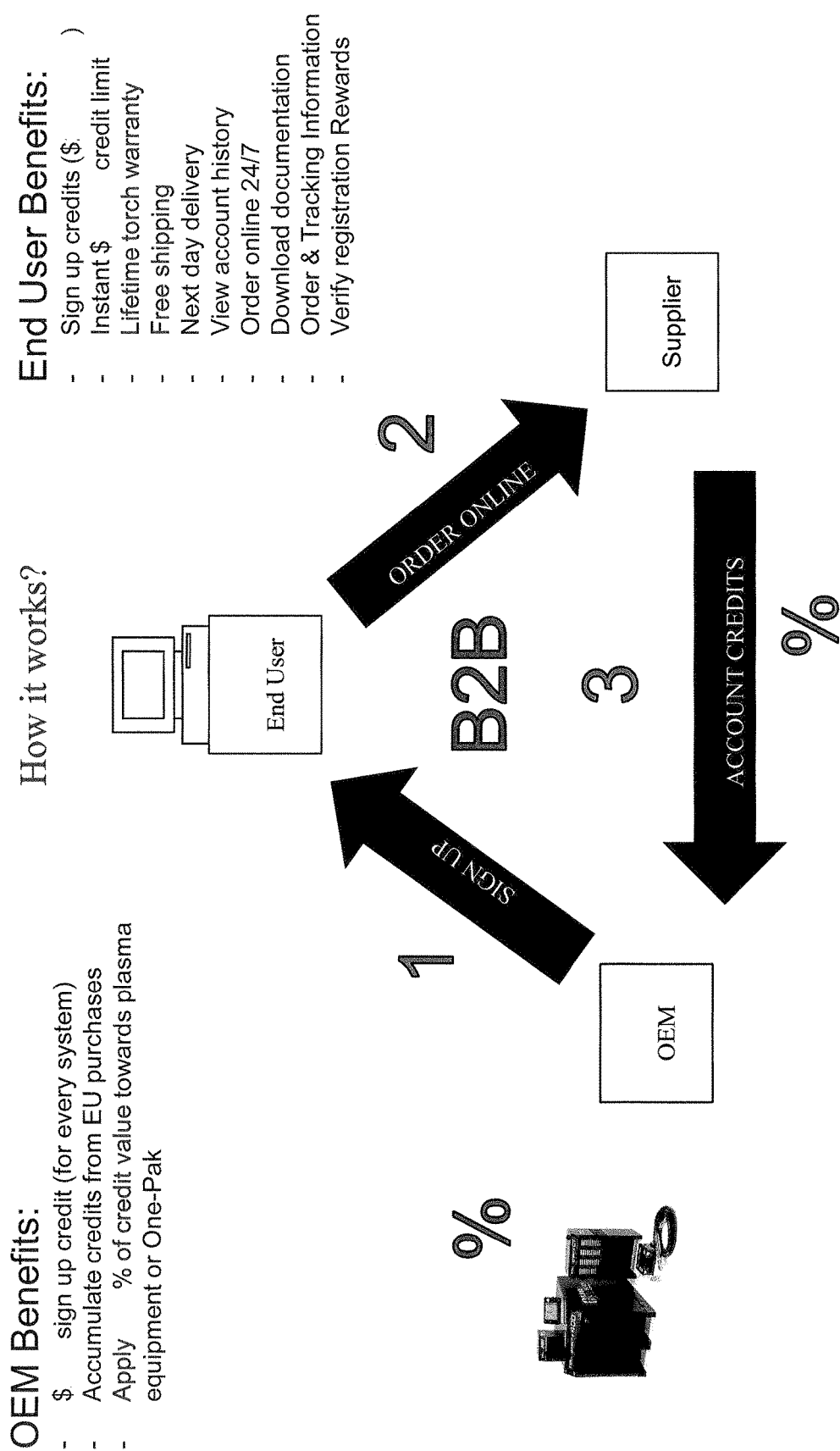

FIG. 5 illustrates a diagram showing the accrual of benefits from FIG. 3 and FIG. 4, as well as how further benefits accrue to the OEM over steps 280 and 290 of the method 200 of FIG. 2, in accordance with an embodiment. For example, the OEM may purchase another subsystem via the OEM on-line account using its on-line credits. Since the OEM is purchasing another subsystem, an enhancement of the on-line credit value of the on-line account credits of the OEM get applied to the subsystem purchase (e.g., a plasma cutting subsystem). In this manner, the OEM leverages its on-line credits with, for example, a multiplying effect. Furthermore, the OEM may receive additional on-line credits for the purchase of the additional subsystem.

If the OEM chooses to redeem on-line credits the second way then, in step 295, the OEM redeems on-line credits from the supplier by purchasing other parts (not a subsystem) from the supplier, or by cashing out, via the supplier web site, without any enhancement of the on-line credits. That is, the OEM can redeem its on-line credits in a 1:1 swap for parts or cash.

Figure 6:
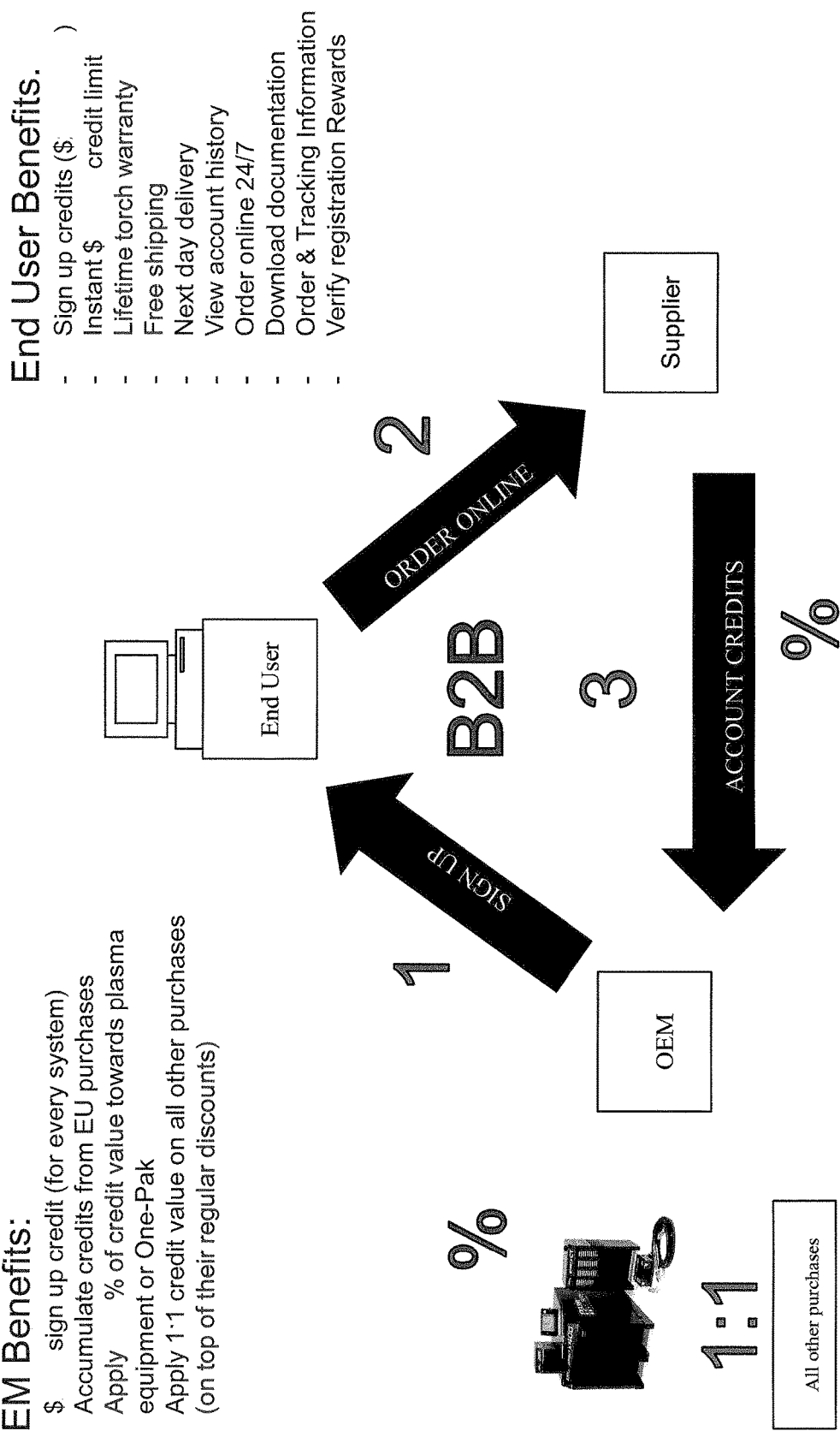

FIG. 6 illustrates a diagram showing the accrual of benefits from FIG. 3, FIG. 4, and FIG. 5, as well as how further benefits accrue to the OEM over steps 280 and 295 of the method 200 of FIG. 2, in accordance with an embodiment. For example, instead of buying another system with OEM on-line credits, the OEM may purchase other parts from the supplier (or take cash) with the on-line credits, without any enhancement or multiplier effect to the OEM on-line credits. As can be seen, there is a definite incentive for the OEM to purchase additional subsystems from the supplier and get additional end users signed up or registered to the supplier web site.

If the OEM decides to purchase another subsystem from the supplier intended for another end user in step 299, then the method reverts back to step 210 and the method unfolds for a new end user. In this manner, a mutually beneficial relationship is established between the supplier, the OEM, and the end users. The supplier benefits because the method 200 encourages repeat business from the OEM and the end users. The OEM benefits by accruing on-line credits from the supplier toward future purchases from the supplier. The end users benefit by being able to go directly to the supplier for replacement parts and materials and by receiving on-line credits and a credit limit from the supplier. All of the interactions between the parties (supplier, OEM, end user) are facilitated in a convenient on-line manner by the supplier web site.

The method steps of the method 200, in accordance with other various embodiments, may be performed in other various orders, or some steps may be omitted. For example, in one embodiment, an OEM may redeem on-line account credits before a most recent end user purchases replacement parts or materials from the supplier. In another embodiment, a most-recent new end user may not bother to register and set up an on-line account with the supplier. In still another embodiment, the OEM may redeem on-line account credits before integrating the subsystem into a larger system.

Figure 7:
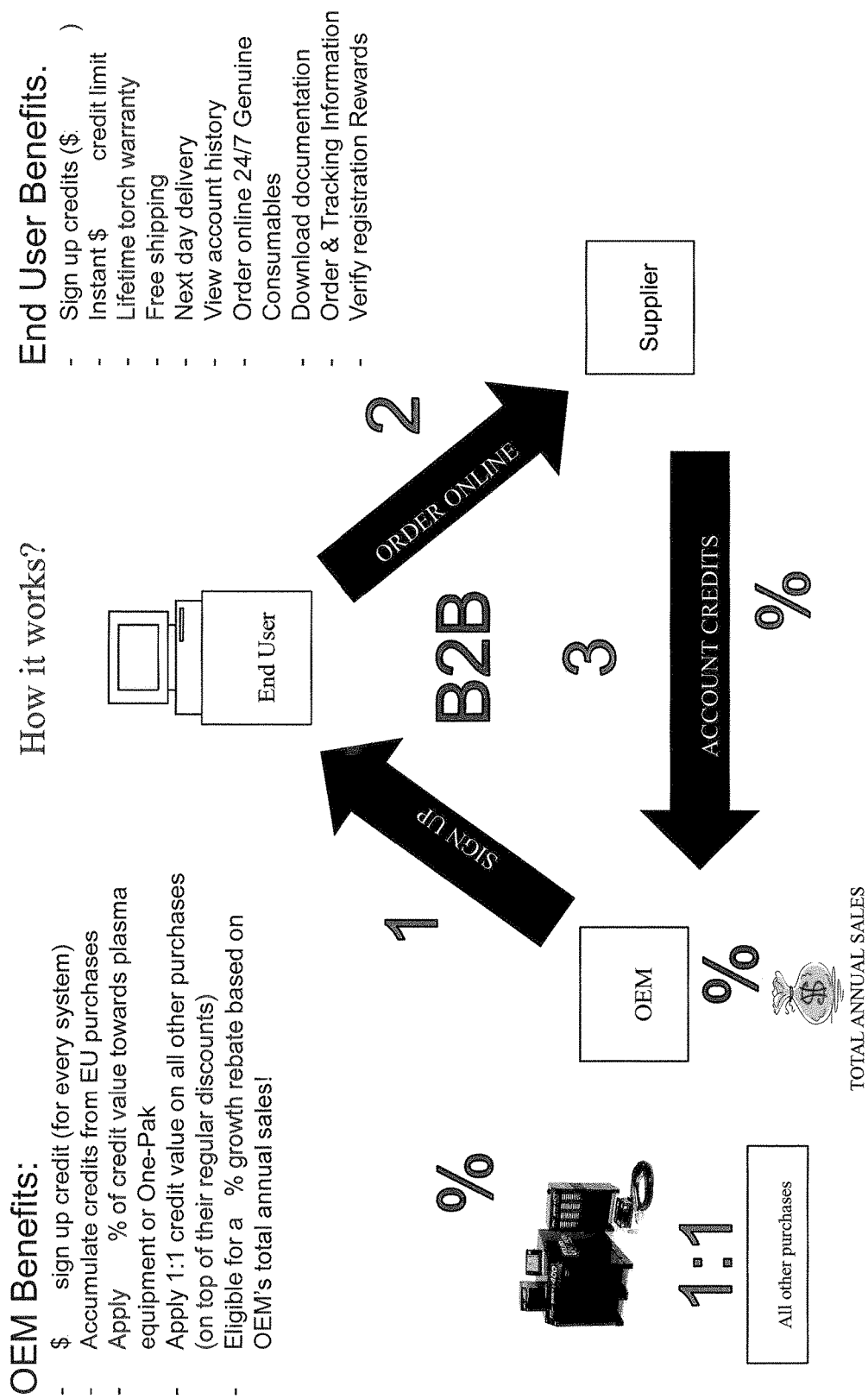
Figure 8:
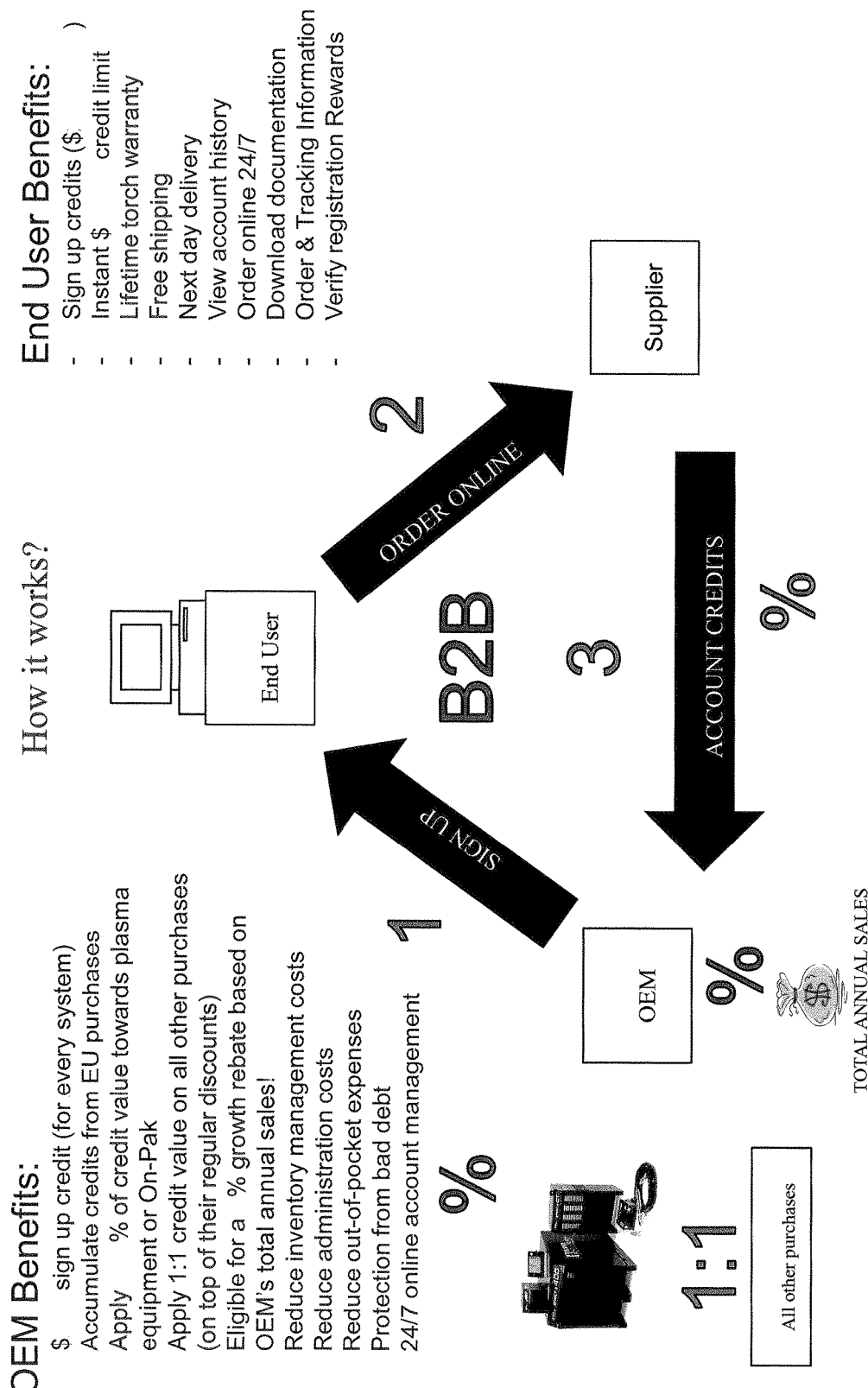
Figure 9:
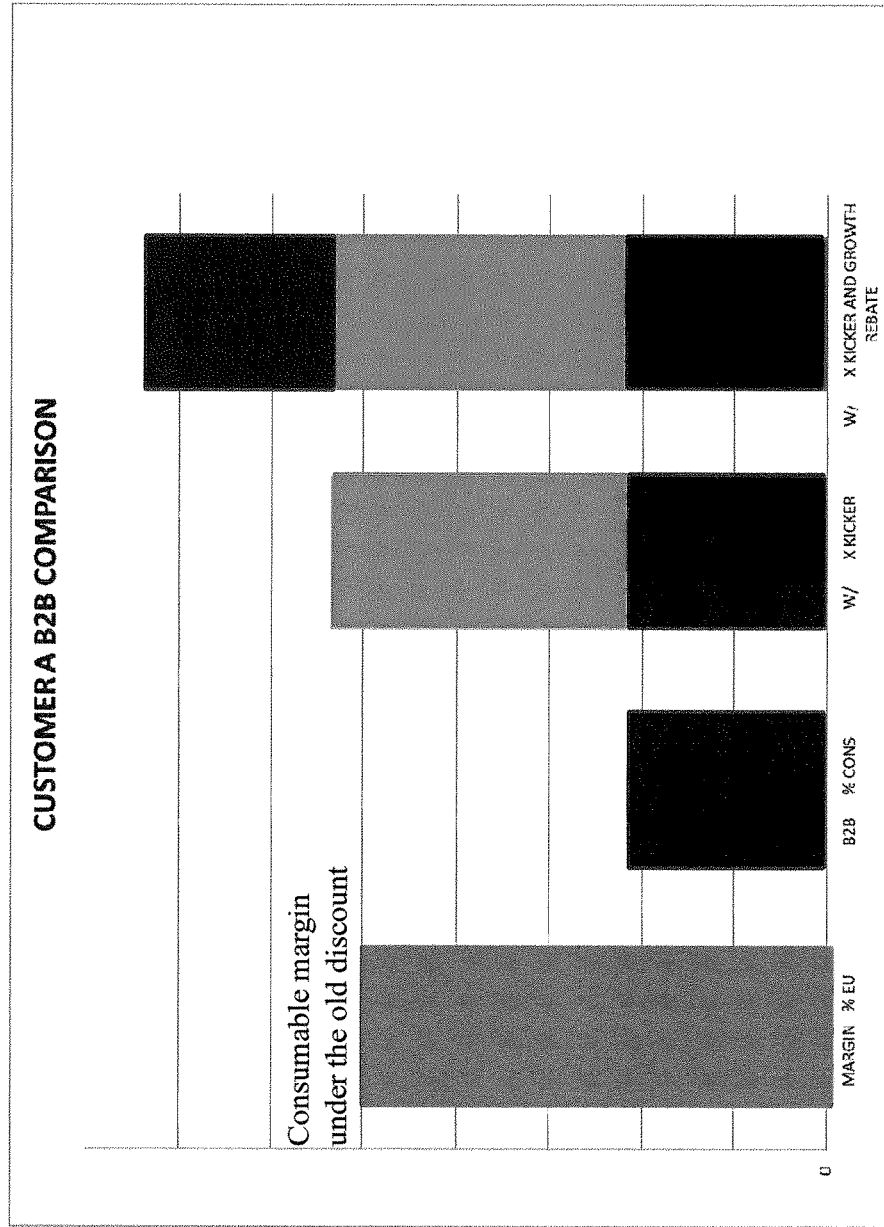
FIGS. 9-13 illustrate graphical bar charts showing an exemplary embodiment of how margins can build up for an OEM by applying the methods describe herein using the system described herein, in comparison to margins gained under a conventional approach.
Figure 10:
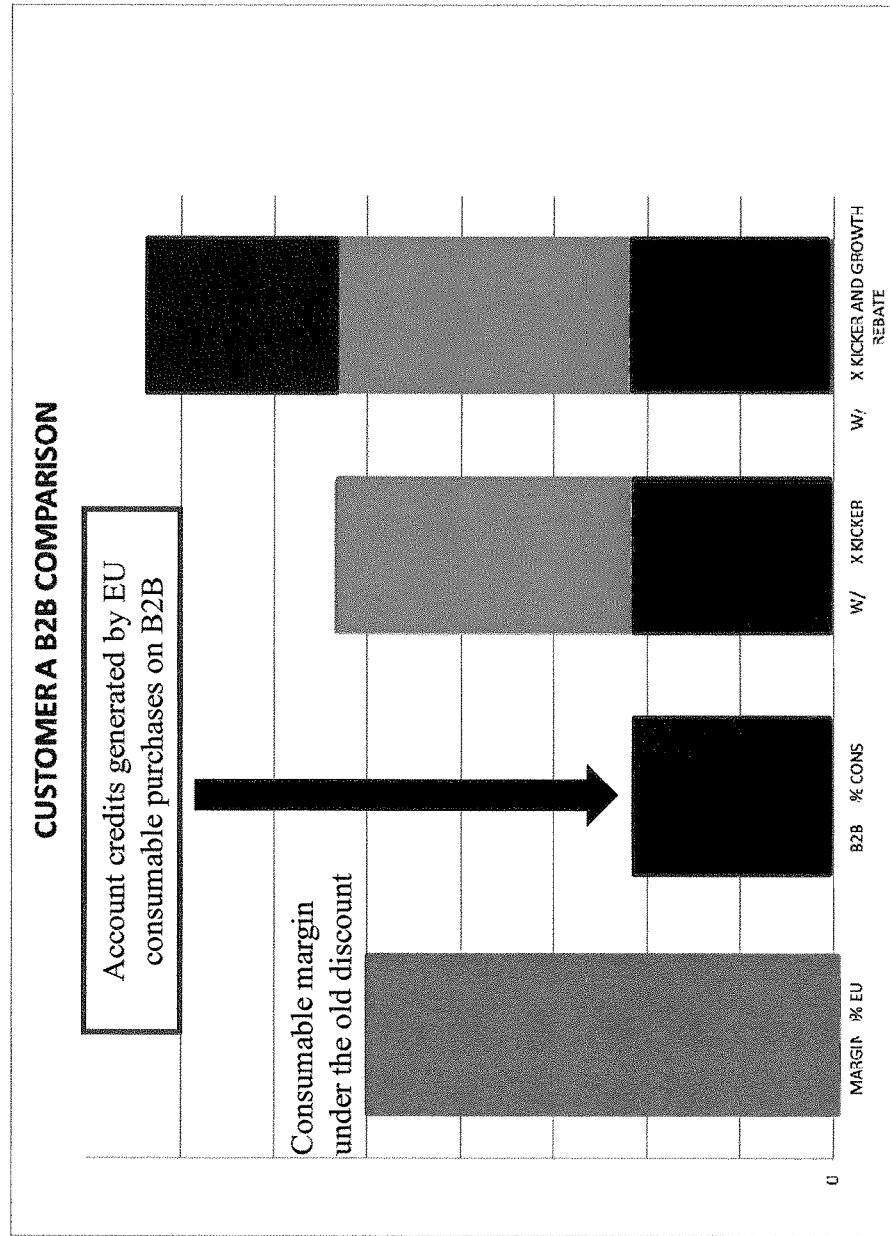
Figure 11:
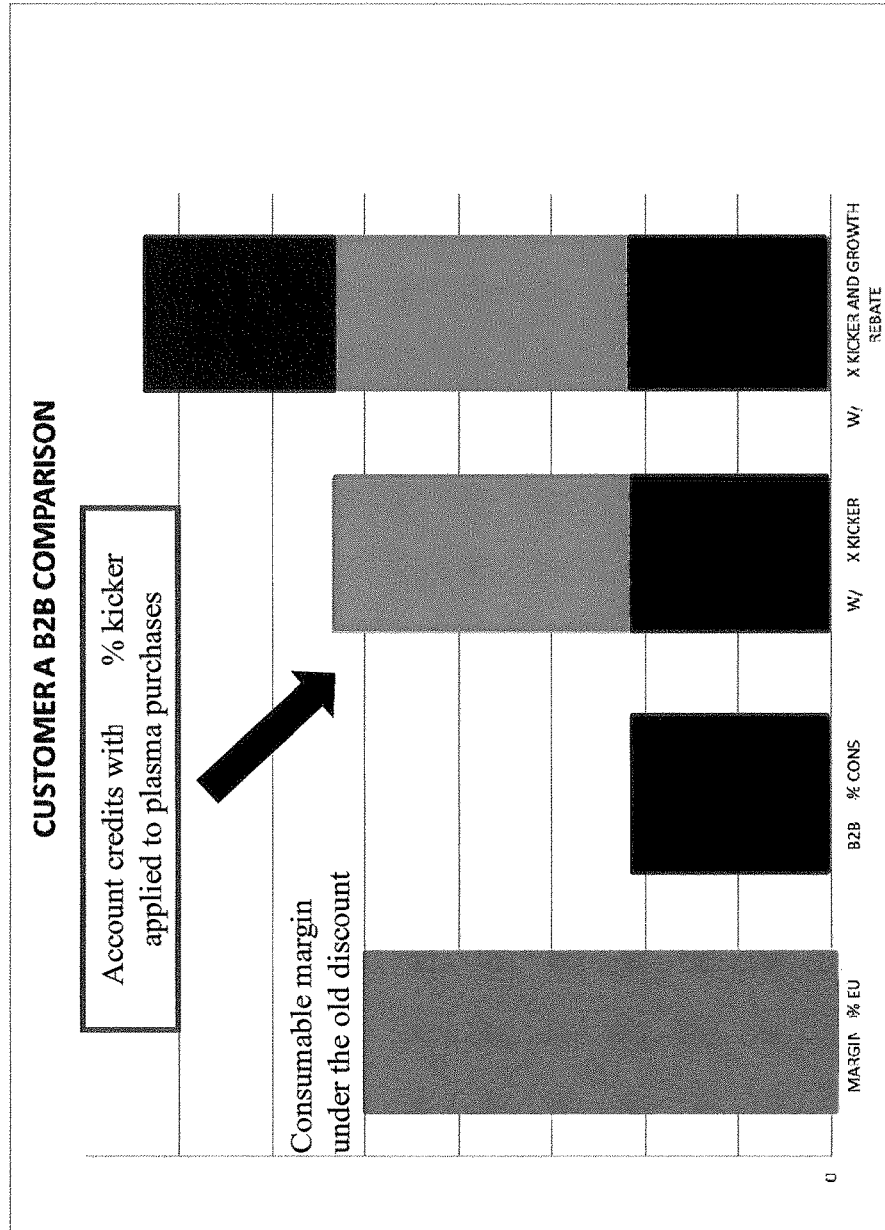
Figure 12:
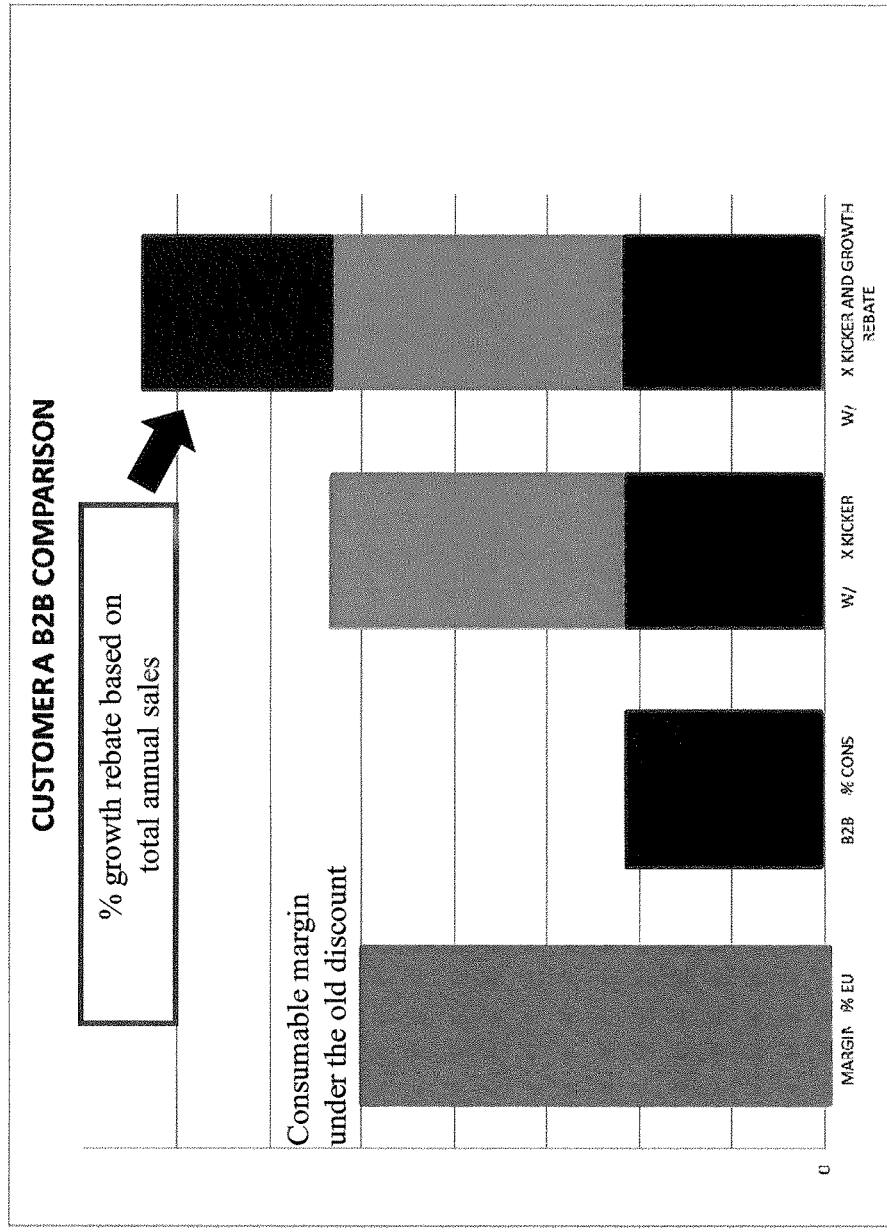
Figure 13:
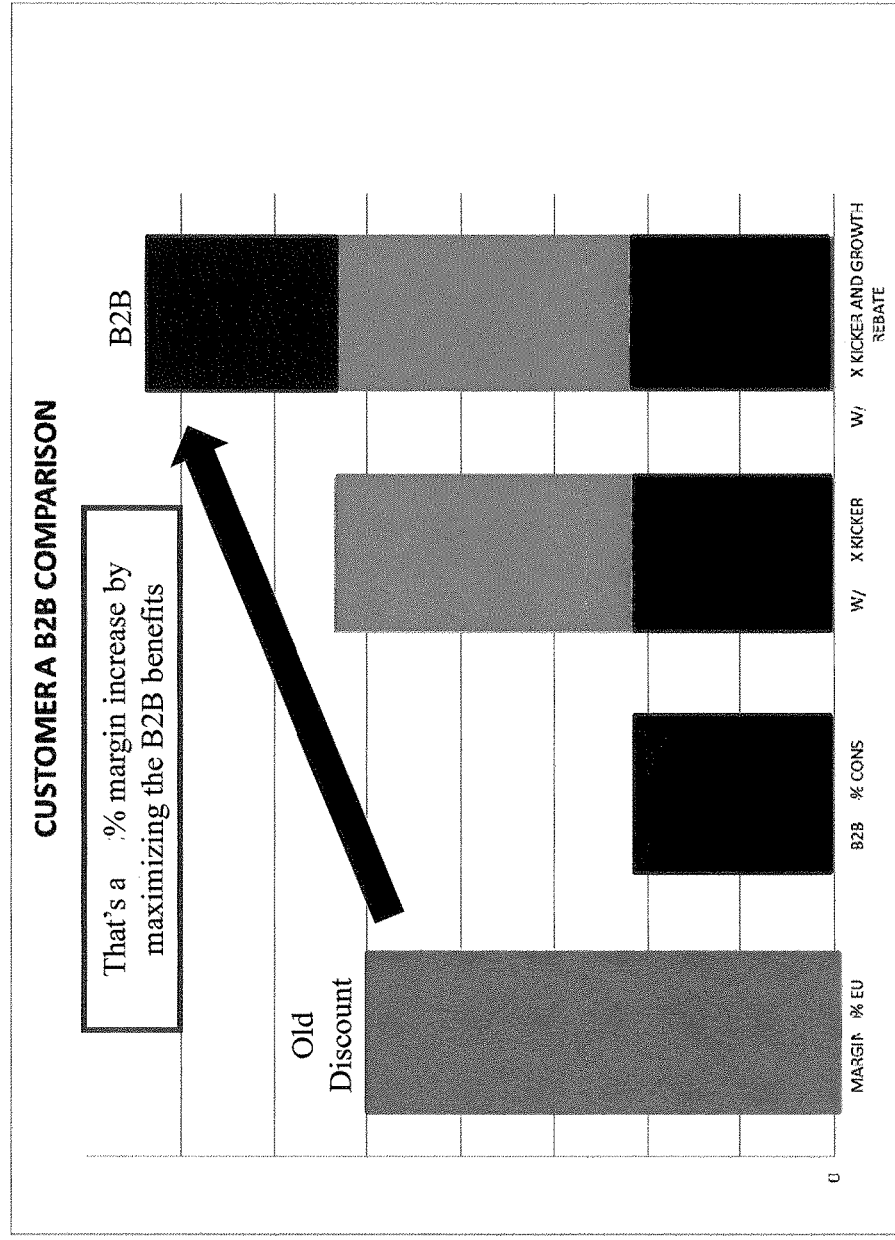

In accordance with an embodiment, the OEM may be eligible for a growth rebate (e.g., x %) based on the OEM's total annual sales as shown in FIG. 7. That is, at the end of the year, the supplier may provide a x % rebate back to the OEM based on the amount spent on buying subsystems from the supplier over the past year. Furthermore, the OEM may reap other benefits including reduced inventory management costs, reduced administration costs, reduced out-of-pocket expenses, protection from bad debt, and anytime (24/7) on-line account management as shown in FIG. 8.

FIGS. 9-13 illustrate graphical bar charts showing an exemplary embodiment of how margins can build up for an OEM by applying the B2B method 200 using the system 100, in comparison to margins gained under a conventional approach. The first graphical bar of the charts of FIGS. 9-13 illustrates a margin for an OEM under the old or conventional approach. The second graphical bar of the charts of FIGS. 9-13 illustrates OEM margin generated by end user purchases of replacement parts or materials from the supplier, where the end user is associated with the OEM. The third graphical bar of the charts of FIGS. 9-13 illustrates the addition of OEM margin when a x % kicker or enhancement is applied to credits from OEM purchases of subsystems from the supplier. The fourth graphical bar of the charts of FIGS. 9-13 illustrates the addition of OEM margin due to a x % growth rebate based on total annual sales from the supplier to the OEM. As can be seen, OEM margins can accumulate well beyond margins achieved under the conventional approach (e.g., x % beyond).

Figure 14:
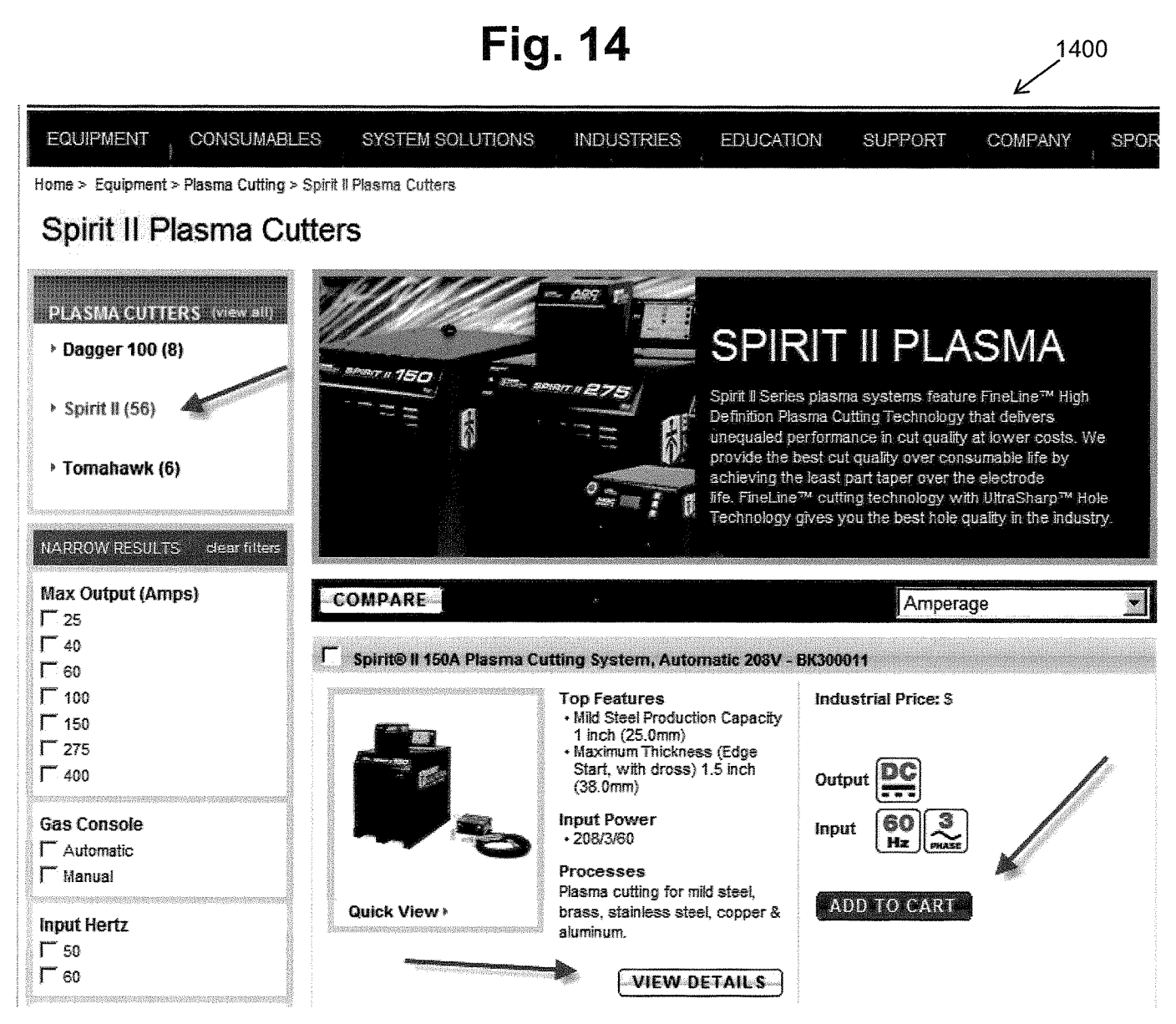
Figure 15:
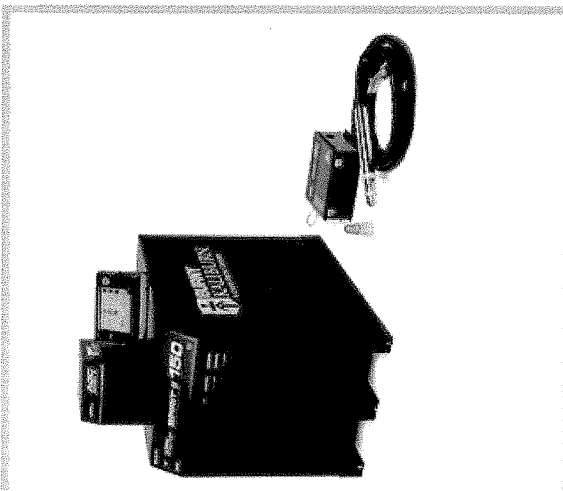

FIG. 14 and FIG. 15 illustrate example embodiments of display screens 1400 and 1500, respectively, provided by the supplier web site via the server 110. The display screens 1400 and 1500 may be displayed to an OEM on the OEM computer system 120 when the OEM is using its on-line account to purchase a subsystem (e.g., a plasma cutter) from the supplier.

FIG. 16 illustrates example embodiments of menu portions of display screens 1610 and 1620 provided by the supplier web site via the server 110. The display screen 1610 may be displayed to an OEM when the OEM is using the supplier web site to, for example, invite an end user to register or sign up with the supplier, check the status of on-line credit rewards, or perform a detailed search of rewards associated with the OEM's on-line account. The display screen 1620 may be displayed to an end user when the end user is using the supplier web site to, for example, register a recently purchased product or check the status of on-line credit rewards associated with the end user's on-line account.

Figure 17:
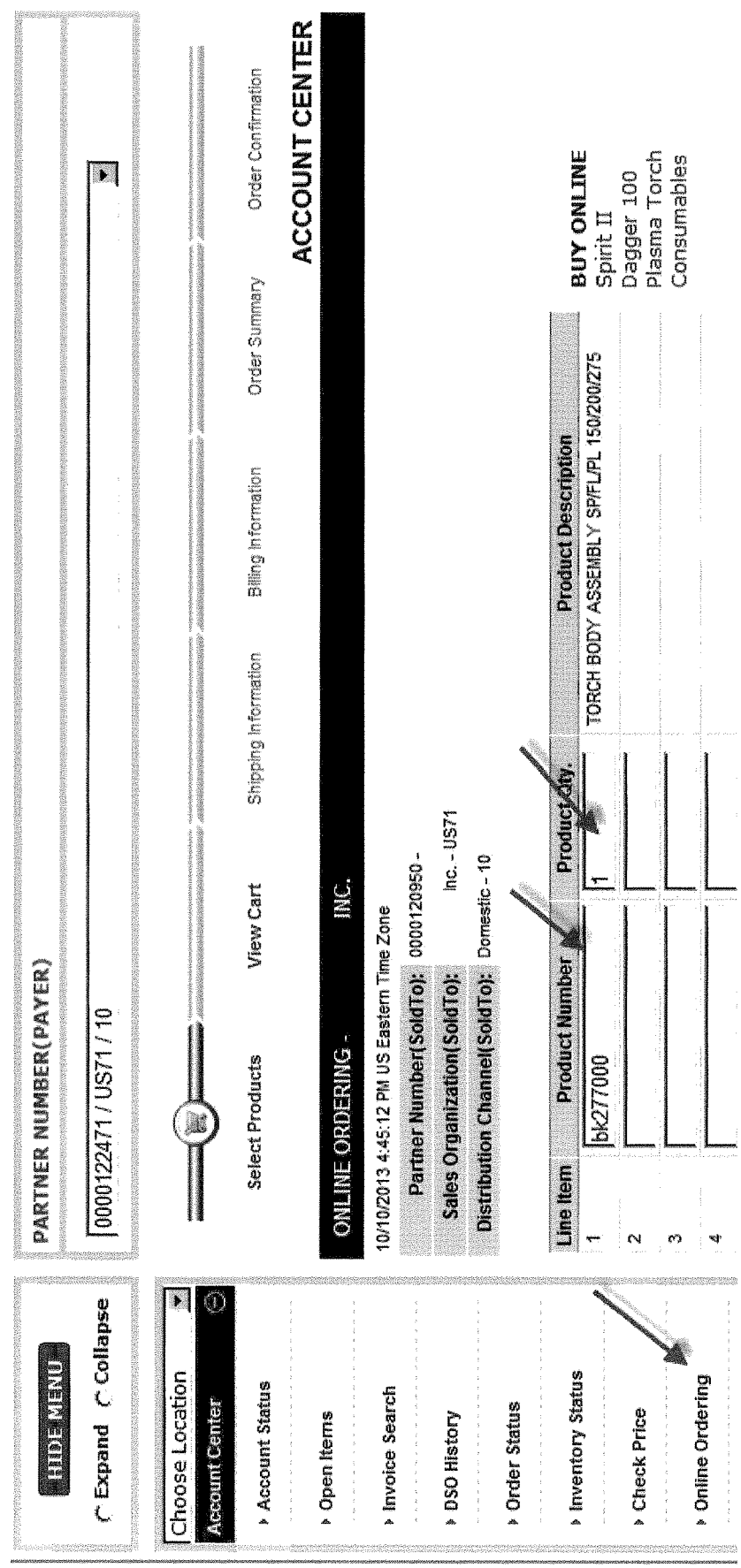
Figure 18:
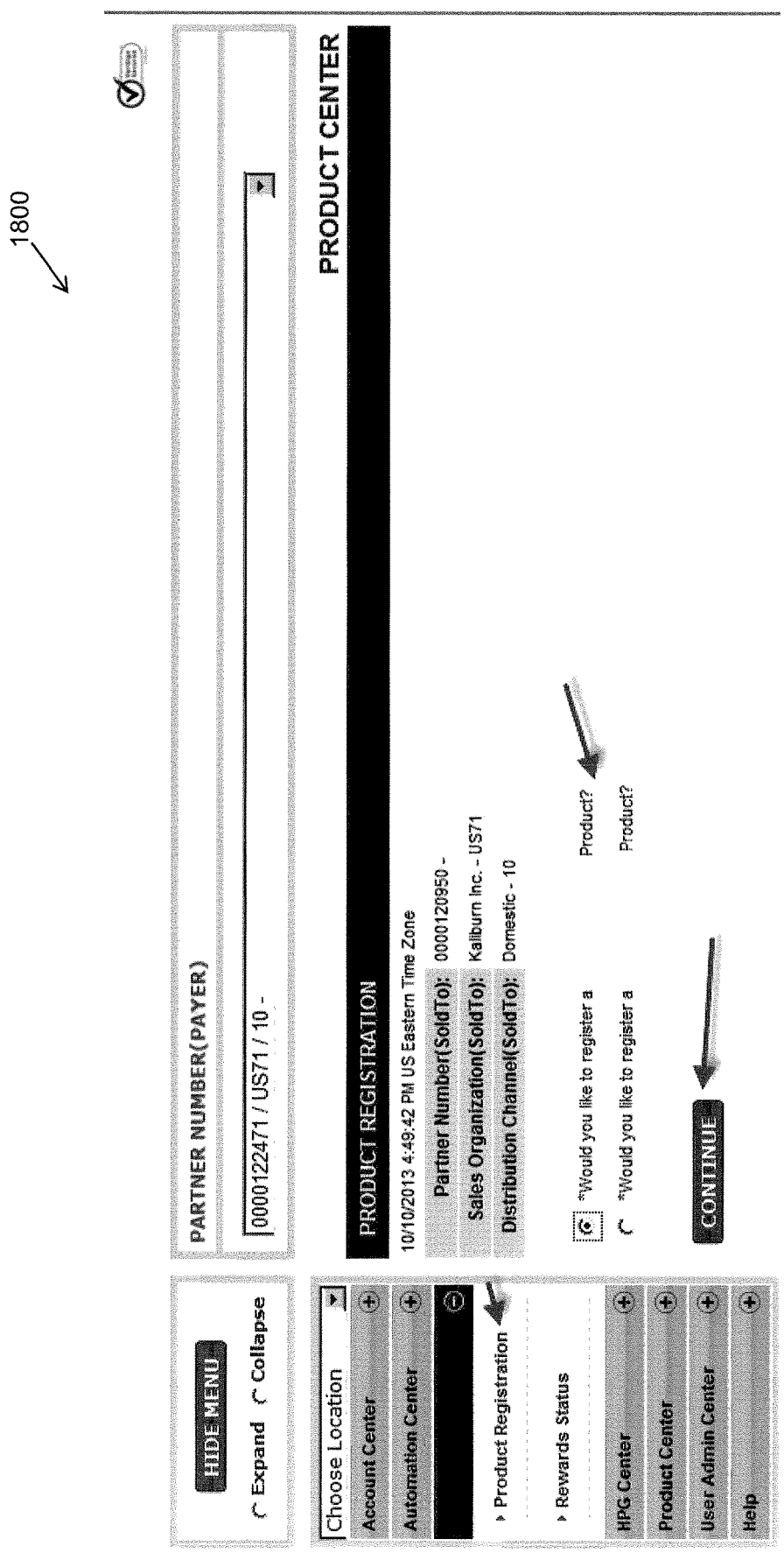
Figure 19:
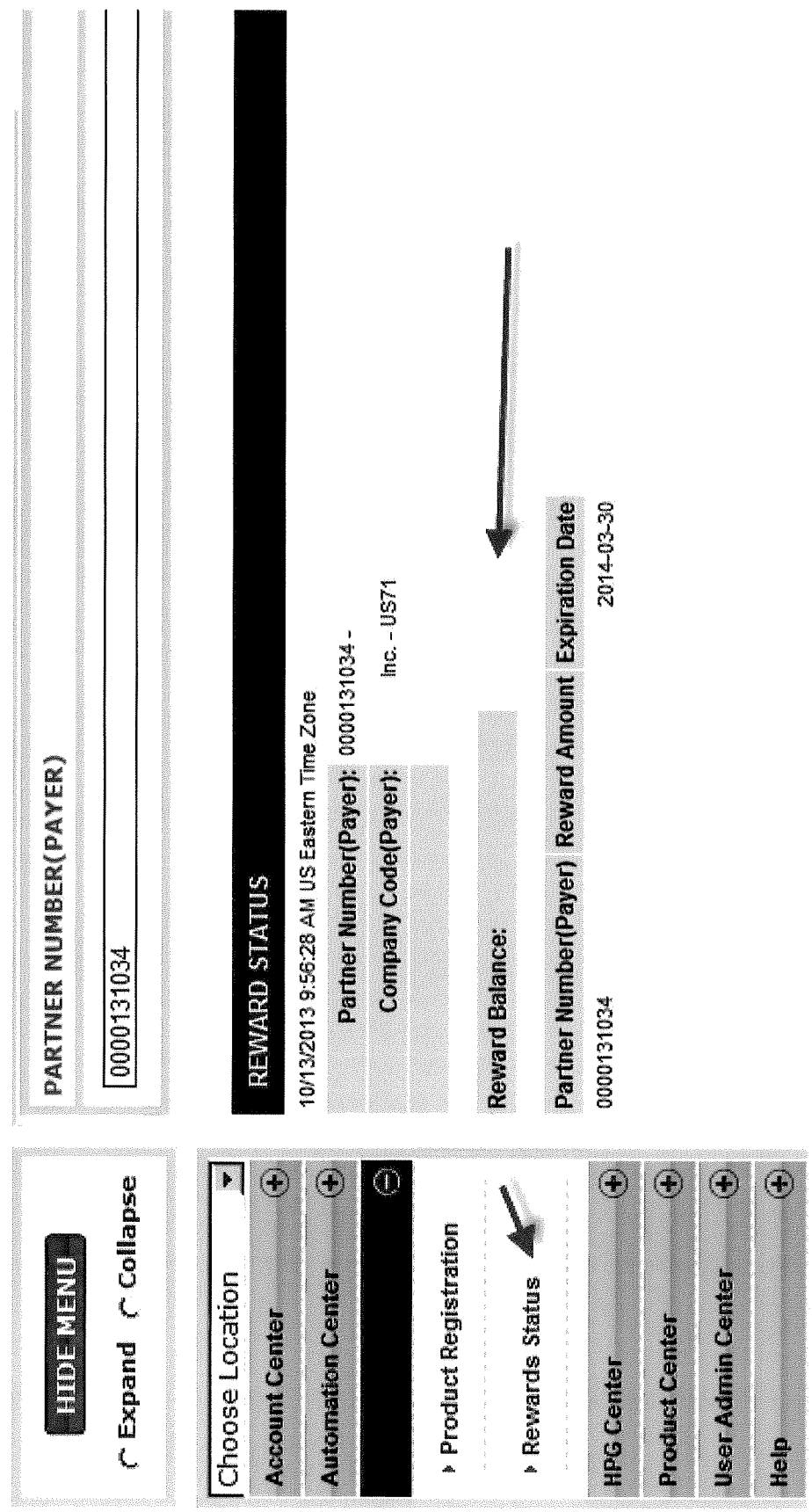
Figure 20:
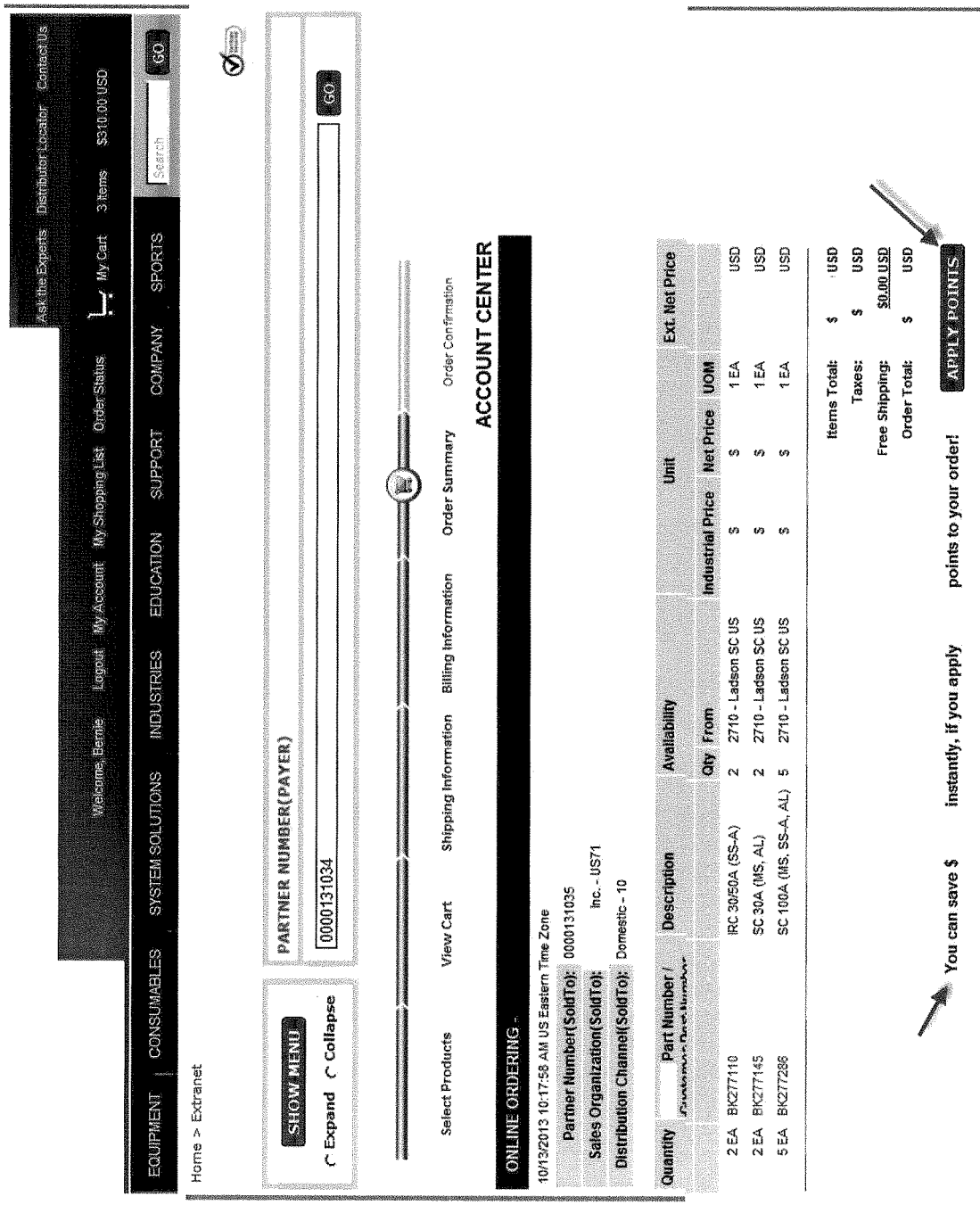

FIG. 17 illustrates an example embodiment of an on-line ordering display screen 1700 provided by the supplier web site via the server 110. FIG. 18 illustrates an example embodiment of a product registration display screen 1800 provided by the supplier web site via the server 110. FIG. 19 illustrates an example embodiment of a rewards status display screen 1900 provided by the supplier web site via the server 110 allowing an end user to check its reward status. FIG. 20 illustrates an example embodiment of a display screen 2000 provided by the supplier web site via the server 110 that allows an OEM or end user to apply on-line reward credits or points to an on-line purchase (i.e., to redeem on-line credits).

Figure 21:
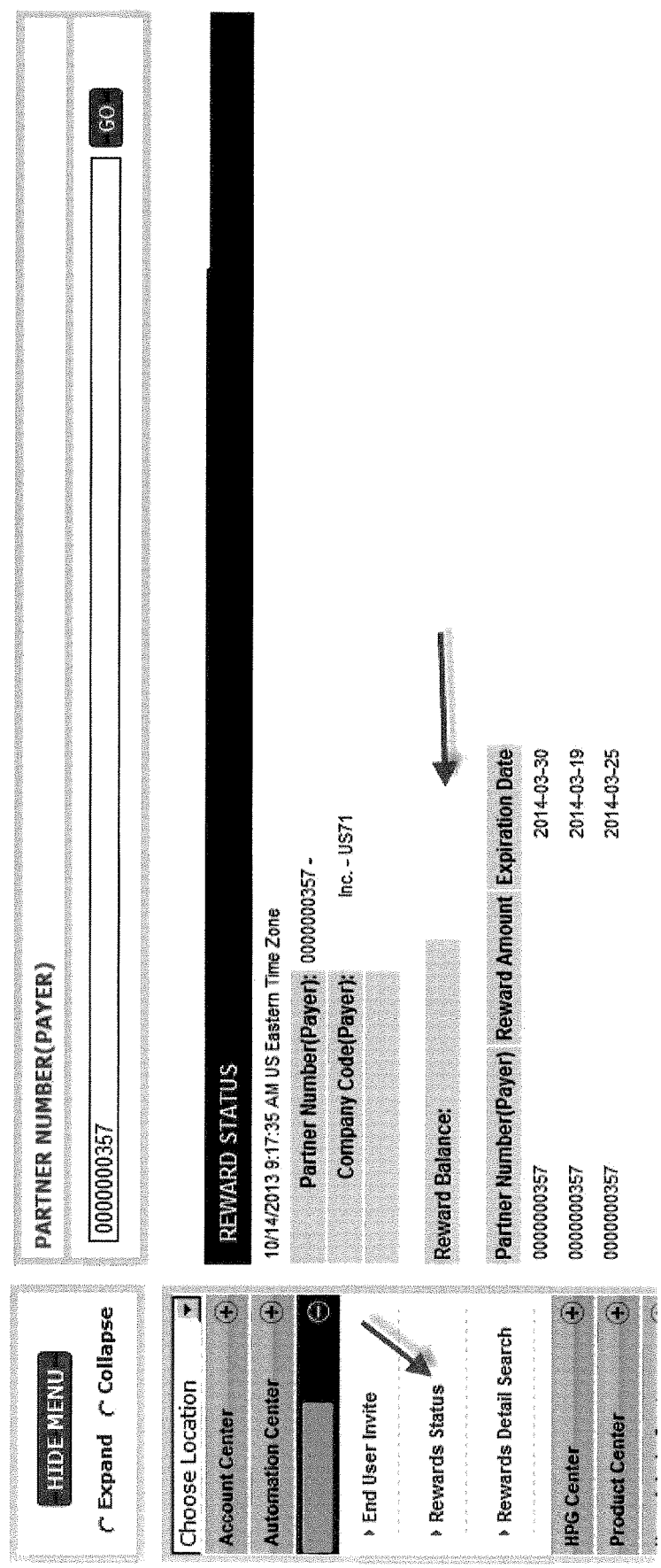

FIG. 21 illustrates an example embodiment of a rewards status display screen 2100 provided by the supplier web site via the server 110 allowing an OEM to check its reward status. FIG. 22 illustrates an example embodiment of a display screen 2200 provided by the supplier web site via the server 110 allowing an OEM to search for which end users contributed to on-line credits for the OEM. FIG. 23 illustrates an example embodiment of a display screen 2300 provided by the supplier web site via the server 110 allowing an OEM to view a summary of an OEM order from the supplier, showing the application of on-line credits (e.g., unenhanced base points and enhanced bonus points). Other display screens are possible as well, in accordance with various embodiments.

In one embodiment, a system is provided having a supplier server computer having a supplier web site providing on-line ordering and account management functionality for original equipment manufacturers (OEMs) and end users associated with a supplier, and an account database computer operatively connected to the supplier server computer and storing a database of OEM accounts and end user accounts. The on-line ordering and account management functionality is configured to: credit an original equipment manufacturer account of an original equipment manufacturer with first original equipment manufacturer on-line account credits in response to the original equipment manufacturer purchasing a first supplier subsystem via the supplier web site of the supplier server computer; credit the original equipment manufacturer account of the original equipment manufacturer with second original equipment manufacturer on-line account credits in response to an end user of the first supplier subsystem purchasing replacement parts or materials via the supplier web site of the supplier server computer; and generate enhanced original equipment manufacturer on-line account credits based on at least one of the first and second original equipment manufacturer on-line account credits, and redeem the enhanced original equipment manufacturer on-line account credits in response to the original equipment manufacturer purchasing a second supplier subsystem via the supplier web site of the supplier server computer. The on-line ordering and account management functionality may be configured to provide a sign-up credit to an end user of a supplier subsystem in response to the end user registering with the supplier web site. The on-line ordering and account management functionality may be configured to provide an instant credit limit to an end user of a supplier subsystem in response to the end user registering with the supplier web site. The on-line ordering and account management functionality may be configured to provide a lifetime warranty on at least a portion of the first supplier subsystem in response to the end user of the first supplier subsystem registering with the supplier web site. The on-line ordering and account management functionality may be configured to provide free shipping and next day delivery of parts and materials to an end user of a supplier subsystem registered with the supplier web site. The on-line ordering and account management functionality may be configured to allow an end user of a supplier subsystem registered with the supplier web site to perform one or more of reviewing an account history associated with the end user, placing an order for parts and materials on-line, downloading documentation, viewing order and tracking information, and verifying registration rewards. The on-line ordering and account management functionality may be configured to allow an original equipment manufacturer registered with the supplier web site to redeem at least one of the first and second original equipment manufacturer on-line account credits by purchasing parts or materials, other than a supplier subsystem, via the supplier web site, without any enhancement of the first and second original equipment manufacturer on-line account credits. The on-line ordering and account management functionality may be configured to allow an original equipment manufacturer registered with the supplier web site to exchange at least one of the first and second original equipment manufacturer on-line account credits for money via the supplier web site, without any enhancement of the first and second original equipment manufacturer on-line account credits. The on-line ordering and account management functionality may be configured to provide a growth rebate to an original equipment manufacturer registered with the supplier web site based on a total annual sales of the original equipment manufacturer. The on-line ordering and account management functionality may be configured to allow an original equipment manufacturer registered with the supplier web site to perform one or more of inviting an end user to register with the supplier web site, checking a status of on-line account credits of the original equipment manufacturer, and performing a detailed search of rewards associated with an on-line account of the original equipment manufacturer. The on-line ordering and account management functionality may be configured to allow an original equipment manufacturer registered with the supplier web site to search for which end users contributed to on-line account credits for the original equipment manufacturer. The on-line ordering and account management functionality may be configured to allow an original equipment manufacturer registered with the supplier web site to view a summary of an original equipment manufacturer order from the supplier web site showing an application of on-line account credits to the order.

In one embodiment, a method is provided including the steps of: selling a first supplier subsystem to an original equipment manufacturer via a supplier web site on a supplier server computer; crediting an on-line account of the original equipment manufacturer, in an account database computer operatively connected to the supplier server computer, with first original equipment manufacturer on-line account credits in response to selling the first supplier subsystem to the original equipment manufacturer via the supplier web site on the supplier server computer; selling parts or materials to an end user of the first supplier subsystem via the supplier web site on the supplier server computer; crediting the on-line account of the original equipment manufacturer, in the account database computer, with second original equipment manufacturer on-line account credits in response to selling the parts or materials to the end user via the supplier web site on the supplier server computer; and selling a second supplier subsystem to the original equipment manufacturer via the supplier web site and applying enhanced original equipment manufacturer on-line account credits to the sale of the second supplier subsystem, wherein the enhanced original equipment manufacturer on-line account credits are derived from one or more of the first original equipment manufacturer on-line account credits and the second original equipment manufacturer on-line account credits. The method may include providing a sign-up credit to an end user of a supplier subsystem, via one or more of the supplier server computer and the account database computer, in response to the end user registering with the supplier web site. The method may include providing an instant credit limit to an end user of a supplier subsystem, via one or more of the supplier server computer and the account database computer, in response to the end user registering with the supplier web site. The method may include providing a lifetime warranty on at least a portion of the first supplier subsystem, via one or more of the supplier server computer and the account database computer, in response to the end user of the first supplier subsystem registering with the supplier web site. The method may include providing free shipping and next day delivery of parts and materials to an end user of a supplier subsystem registered with the supplier web site. The method may include providing a growth rebate to an original equipment manufacturer registered with the supplier web site, via one or more of the supplier server computer and the account database computer, based on a total annual sales of the original equipment manufacturer. The method may include associating at least one end user of at least one supplier subsystem with an original equipment manufacturer, in the account database computer, in response to the at least one end user of the at least one supplier subsystem registering with the supplier web site.

In one embodiment, a system is provided by a supplier of supplier subsystems. The system includes a supplier server, a supplier web site, and a supplier database. The system is configured to provide on-line ordering and account management functionality for original equipment manufacturers and end users of the supplier subsystems to establish business incentives that are mutually beneficial to the supplier, the original equipment manufacturers, and the end users.

In one embodiment, a non-transitory computer readable storage medium including computer-readable instructions tangibly stored thereon for execution by a processor, is provided. The computer-readable instructions include: instructions for crediting an on-line account of an original equipment manufacturer with first original equipment manufacturer on-line account credits in response to selling a first supplier subsystem to the original equipment manufacturer via a supplier web site; instructions for crediting the on-line account of the original equipment manufacturer with second original equipment manufacturer on-line account credits in response to selling parts or materials to an end user of the first supplier subsystem via the supplier web site; instructions for generating enhanced original equipment manufacturer on-line account credits from one or more of the first original equipment manufacturer on-line account credits and the second original equipment manufacturer on-line account credits; and instructions for applying the enhanced original equipment manufacturer on-line account credits to the sale of a second supplier subsystem to the original equipment manufacturer via the supplier web site.

In summary, systems and methods to accommodate business relationships between a supplier, an original equipment manufacturer (OEM), and an end user are provided. A supplier provides a server having a web site that is accessible by OEM's and end users to purchase subsystems and consumable parts and materials. The OEM's and end users are associated with each other in the server in accordance with established business relationships. The server manages accounts of the OEM's and associated end users to reward on-line credits to the OEM's and the end users when the OEM's and the end users make purchases from the supplier. The rewarding of on-line credits are structured to generate future business for the supplier from the OEM's and the associated end users.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. § 112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A system, comprising:
    a supplier server computer, associated with a supplier, having a processor and a memory, the supplier server computer provides:
        a supplier web site providing on-line ordering and account management functionality to original equipment manufacturers and end users of the original equipment manufacturers; and
        an account database of original equipment manufacturer accounts and end user accounts,
    wherein the memory stores computer-executable instructions that, when executed by the processor, configure the processor to:
        establish a computerized association between an original equipment manufacturer account of an original equipment manufacturer and an end user account of an end user within the supplier server computer in response to the end user creating the end user account with the supplier via the supplier web site,
            wherein the original equipment manufacturer incorporates a subsystem of the supplier into a product, and
            wherein the end user purchases the product incorporating the subsystem from the original equipment manufacturer;
        credit the original equipment manufacturer account of the original equipment manufacturer with a first set of account credits in response to the original equipment manufacturer purchasing a first supplier subsystem from the supplier via the supplier web site;
        based on the computerized association between the original equipment manufacturer and the end user, credit the original equipment manufacturer account with a second set of account credits in response to the end user making a purchase via the supplier web site related to the subsystem of the supplier incorporated into the product of the original equipment manufacturer; and
        enhance a redemption value of at least one of the first or second set of account credits of the original equipment manufacturer, by applying a multiplier to account credits of at least one of the first or second set of account credits, when the original equipment manufacturer redeems the account credits of at least one of the first or second set of account credits to purchase a second supplier subsystem from the supplier via the supplier web site.

2. The system of claim 1, wherein the computer-executable instructions further configure the processor to provide a sign-up credit to the end user of the product of the original equipment manufacturer that includes the first supplier subsystem in response to the end user creating the end user account with the supplier via the supplier web site.

3. The system of claim 1, wherein the computer-executable instructions further configure the processor to extend credit having a credit limit to the end user account of the end user of the product of the original equipment manufacturer that includes the first supplier subsystem in response to the end user creating the end user account with the supplier via the supplier web site.

4. The system of claim 1, wherein the computer-executable instructions further configure the processor to indicate, on the end user account, a lifetime warranty on at least a portion of the first supplier subsystem included in the product of the original equipment manufacturer in response to the end user of the product registering the first supplier subsystem via the supplier web site.

5. The system of claim 1, wherein the computer-executable instructions further configure the processor to enable free shipping and next day delivery for parts and materials to end users of products including supplier subsystems registered with the supplier web site.

6. The system of claim 1, wherein the computer-executable instructions further configure the processor to respond to input from end users, of products including supplier subsystems, with the supplier web site to enable the end users to review account histories respectively associated with the end users, place orders for parts and materials via the supplier web site, download documentation, view order and tracking information, or verify registration rewards.

7. The system of claim 1, wherein the computer-executable instructions further configure the processor to debit an amount of account credits from the original equipment manufacturer account in response to the original equipment manufacturer redeeming account credits to purchase parts or materials, other than a supplier subsystem, via the supplier web site, wherein the account credits are redeemed without enhancement of the redemption value of the account credits.

8. The system of claim 1, wherein the computer-executable instructions further configure the processor to debit an amount of account credits from the original equipment manufacturer account in response to the original equipment manufacturer redeeming account credits for money via the supplier web site, without any enhancement of the redemption value of the account credits.

9. The system of claim 1, wherein the computer-executable instructions further configure the processor to generate a growth rebate for the original equipment manufacturer based on total annual sales to the original equipment manufacturer.

10. The system of claim 1, wherein the computer-executable instructions further configure the processor to respond to input from original equipment manufacturers registered with the supplier web site to enable the original equipment manufacturers to invite end users to register with the supplier web site, check a status of account credits, or search rewards associated with accounts of the original equipment manufacturers.

11. The system of claim 1, wherein the computer-executable instructions further configure the processor to search, responsive to input from the original equipment manufacturer via the supplier web site, for which end users contributed account credits for the original equipment manufacturer.

12. The system of claim 1, wherein the computer-executable instructions further configure the processor to output, to the original equipment manufacturer via the supplier web site, a summary of an order of the original equipment manufacturer from the supplier web site showing an application of account credits to the order.

13. A non-transitory, computer-readable storage medium having stored thereon computer-executable instructions that, when executed by a processor, configure the processor to:
generate and output a supplier website of a supplier providing on-line ordering and account management functionality to original equipment manufacturers and end users of systems of the original equipment manufacturers;
establish a computerized association between an original equipment manufacturer account, in an account database, of an original equipment manufacturer and an end user account, in the account database, of an end user in response to the end user creating the end user account with the supplier via the supplier website,
wherein the original equipment manufacturer incorporates a subsystem of the supplier into a product, and wherein the end user purchases the product incorporating the subsystem from the original equipment manufacturer;
credit the original equipment manufacturer account with a first set of account credits in response to the original equipment manufacturer purchasing a first supplier subsystem via the supplier web site;
based on the computerized association between the original equipment manufacturer and the end user, credit the original equipment manufacturer account with a second set of account credits in response to the end user purchasing at least one of parts or materials via the supplier web site related to the subsystem of the supplier incorporated into the product of the original equipment manufacturer; and
enhance a redemption value of at least one of the first or second set of account credits of the original equipment manufacturer, by applying a multiplier to account credits of at least one of the first or second set of account credits, when the original equipment manufacturer redeems the account credits of at least one of the first or second set of account credits to purchase a second supplier subsystem from the supplier via the supplier web site.

14. The non-transitory computer-readable storage medium of claim 13, further storing computer-executable instructions that configure the processor to generate a sign-up credit to the end user of the system of the original equipment manufacturer that includes the first supplier subsystem in response to the end user creating the end user account with the supplier via the supplier web site.

15. The non-transitory computer-readable storage medium of claim 13, further storing computer-executable instructions that configure the processor to extend credit to the end user by indicating a credit limit for the end user account of the end user of the system of the original equipment manufacturer that includes the first supplier subsystem in response to the end user creating the end user account with the supplier via the supplier web site.

16. The non-transitory computer-readable storage medium of claim 13, further storing computer-executable instructions that configure the processor to provide a lifetime warranty on at least a portion of the first supplier subsystem included in the system of the original equipment manufacturer through indication on the end user account associated with the end user in response to the end user registering the first supplier subsystem with the supplier via the supplier web site.

17. The non-transitory computer-readable storage medium of claim 13, further storing computer-executable instructions that configure the processor to enable free shipping and next day delivery for parts and materials to end users of systems including supplier subsystems registered with the supplier web site.

18. The non-transitory computer-readable storage medium of claim 13, further storing computer-executable instructions that configure the processor to generate a growth rebate for the original equipment manufacturer based on total annual sales to the original equipment manufacturer.

19. The non-transitory computer-readable storage medium of claim 13, further storing computer-executable instructions that configure the processor to associate at least one end user of a system including at least one supplier subsystem with the original equipment manufacturer of the system, in the account database, in response to the at least one end user registering with the supplier web site.

20. A system provided by a supplier of supplier subsystems, the system comprising:
- a supplier server computer of a supplier having a processor and memory, the supplier server computer providing a supplier web site for on-line ordering and account management for original equipment manufacturers and end users of the original equipment manufacturers; and
- a computing device hosting a supplier database storing end user accounts and original equipment manufacturer accounts,
- wherein the memory of the supplier server computer stores computer-executable instruction to configure the processor to:
- generate and output the supplier website;
- establish a computerized association between an original equipment manufacturer account, in the supplier database, of an original equipment manufacturer and an end user account, in the supplier database, of an end user in response to the end user creating the end user account with the supplier via the supplier website,
  - wherein the original equipment manufacturer incorporates a subsystem of the supplier into a product, and
  - wherein the end user purchases the product incorporating the subsystem from the original equipment manufacturer;
- credit the original equipment manufacturer account, in the supplier database, with a first amount of account credits in response to the original equipment manufacturer purchasing a first supplier subsystem from the supplier via the supplier web site;
- based on the computerized association between the original equipment manufacturer and the end user, credit the original equipment manufacturer account with a second amount of account credits in response to the end user purchasing at least one of parts or materials from the supplier via the supplier web site related to the subsystem of the supplier incorporated into the product of the original equipment manufacturer; and
- enhance a redemption value of at least one of the first or second amount of account credits of the original equipment manufacturer, by applying a multiplier to account credits of at least one of the first or second amount of account credits, when the original equipment manufacturer redeems the account credits of at least one of the first or second amount of account credits to purchase a second supplier subsystem from the supplier via the supplier web site.

\* \* \* \* \*